United States Patent
Dai et al.

(10) Patent No.: US 9,585,111 B2
(45) Date of Patent: Feb. 28, 2017

(54) MIMO SLOTTED ALOHA (MSA) SYSTEM

(71) Applicant: Elbit Systems of America, LLC, Fort Worth, TX (US)

(72) Inventors: Qingyuan Dai, Germantown, MD (US); Charles H. Woloszynski, Vienna, VA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 52 days.

(21) Appl. No.: 14/029,966

(22) Filed: Sep. 18, 2013

(65) Prior Publication Data

US 2014/0016626 A1   Jan. 16, 2014

Related U.S. Application Data

(63) Continuation of application No. 12/388,912, filed on Feb. 19, 2009, now Pat. No. 8,553,824.

(Continued)

(51) Int. Cl.
*H04L 7/00* (2006.01)
*H04W 56/00* (2009.01)
(Continued)

(52) U.S. Cl.
CPC ......... *H04W 56/001* (2013.01); *H04J 3/0605* (2013.01); *H04L 27/2656* (2013.01); *H04L 27/2657* (2013.01)

(58) Field of Classification Search
CPC .... H04B 7/01; H04B 7/015; H04J 3/06; H04J 3/24; H04K 1/10; H04L 1/02; H04L 7/00; H04L 7/02; H04L 27/08; H04W 24/04; H04W 56/00

USPC ....... 370/324, 336, 345, 350, 442, 503, 509; 375/135, 259, 260, 267, 345, 354, 355; 455/127.2, 296, 502

See application file for complete search history.

(56) References Cited

U.S. PATENT DOCUMENTS 8,363,757 B1 * 1/2013 Meng .................. H03J 7/04
370/208
2004/0005902 A1   1/2004 Belcea
(Continued)

OTHER PUBLICATIONS

Extended Search Report for Application No. 09712005.9, dated May 23, 2016.

*Primary Examiner* — Shawkat M Ali
(74) *Attorney, Agent, or Firm* — Conley Rose, P.C.

(57) ABSTRACT

A method including receiving at a synchronizing node a first reference frame from a first reference node at a first time and storing a first time value representing the first time, and calculating a timing estimator by subtracting a minimum time value, representing the distance from the synchronizing node to the first reference node, from the first time value. The method includes receiving at the synchronizing node a second reference frame at a second time and transmitting from the synchronizing node to the first reference node a short timing contention time frame. The method includes receiving at the synchronizing node from the first reference node an arrival time value representing the time at which the first reference node received the short timing contention frame and calculating a time drift from the first arrival time value and the second time value and adjusting the timing estimator based on the time drift.

10 Claims, 16 Drawing Sheets

Related U.S. Application Data

(60) Provisional application No. 61/029,735, filed on Feb. 19, 2008.

(51) Int. Cl.
  *H04J 3/06* (2006.01)
  *H04L 27/26* (2006.01)

(56) References Cited

U.S. PATENT DOCUMENTS

| | | | |
|---|---|---|---|
| 2005/0041692 A1* | 2/2005 | Kallstenius | H04J 3/0667 370/503 |
| 2005/0169233 A1* | 8/2005 | Kandala et al. | 370/349 |
| 2007/0025481 A1* | 2/2007 | Ryu et al. | 375/354 |
| 2007/0140212 A1* | 6/2007 | Gaikwad | H04L 27/2657 370/350 |
| 2007/0147436 A1* | 6/2007 | Zumsteg | 370/509 |
| 2007/0180137 A1 | 8/2007 | Rajapakse | |
| 2009/0274250 A1* | 11/2009 | Li | 375/344 |

* cited by examiner

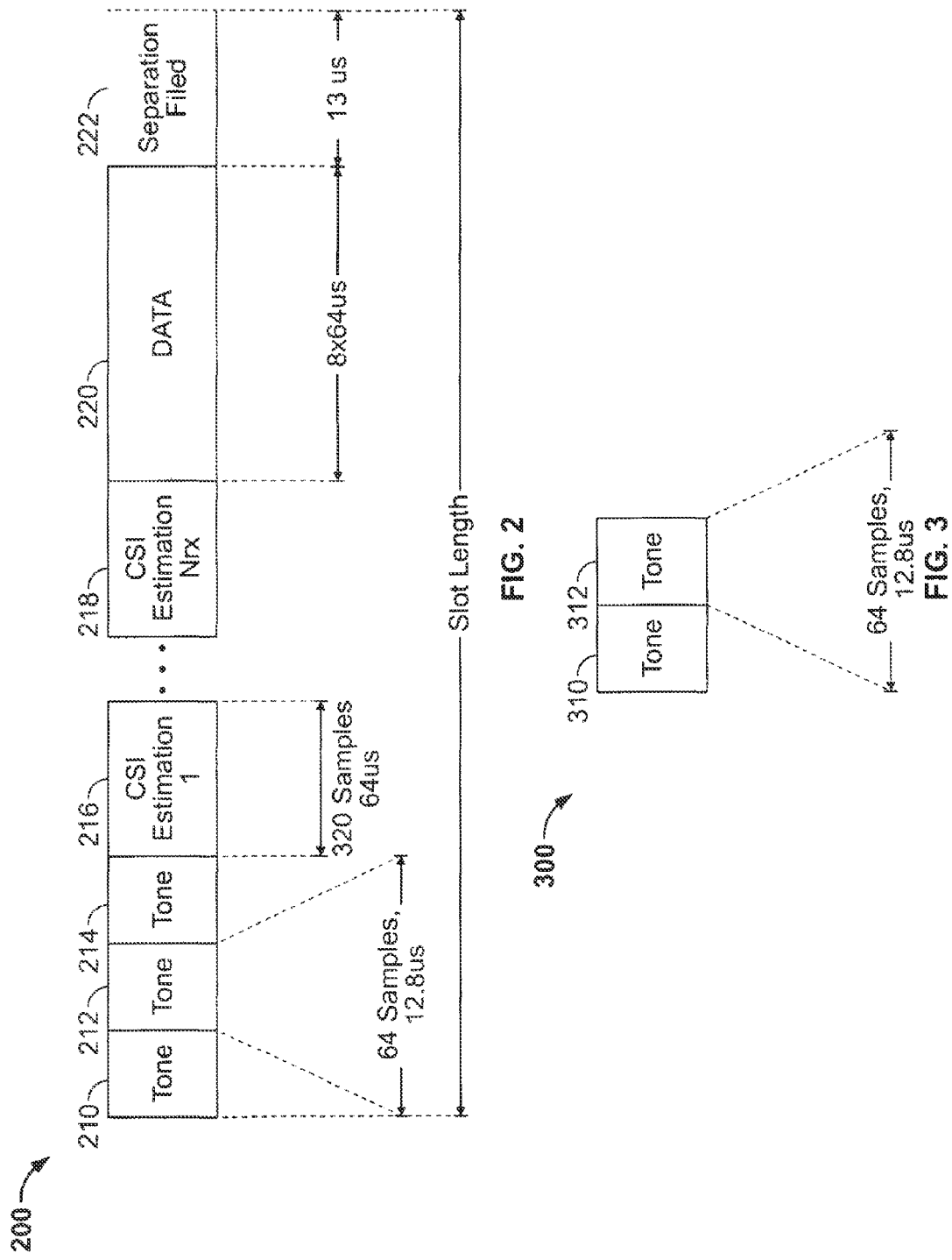

MIMO SLOTTED ALOHA (MSA) SYSTEM

CROSS-REFERENCE TO RELATED APPLICATION

This application is a continuation of pending U.S. application Ser. No. 12/388,912 filed Feb. 19, 2009, entitled "MIMO Slotted Aloha (MSA) System," which claims the benefit of U.S. Provisional Patent Application Ser. No. 61/029,735, filed Feb. 19, 2008, which is hereby incorporated by reference in its entirety.

FIELD OF THE INVENTION

The present invention relates to wireless communication, and more specifically to multiple input/multiple output Slotted Aloha systems.

BACKGROUND

Ad-hoc wireless networks offer communications solutions where individual devices (or nodes) can communicate directly with other nodes, without any network provisioning or central points of failure. For example, in an ad hoc wireless network, two wireless radios can communicate directly with each other, or through other radios on the network, instead of having to transmit through a dedicated central access point. These networks traditionally use carrier sense multiple access/collision avoidance ("CSMA/CA") as their media access control mechanism, as they have no central control entity. A media access control, or MAC, mechanism provides a protocol for accessing and controlling communication channels. However, CSMA/CA does not perform well in the presence of a highly-varied channel or over large distances. The CSMA/CA protocol is built on the assumption that all nodes can detect the transmissions of the other nodes that they may attempt to communicate with.

A simple string of pearls configuration (several nodes in a linear configuration) can easily create a situation where two nodes, at both ends of the string, attempt to communicate with a node in the middle of the string and, because the two transmitting nodes cannot hear each other, both end nodes transmit messages to the middle node. The result is that the middle node hears both transmissions, but cannot decode either transmission. This is known as a "collision." This simple example is known as the "hidden node" problem for CSMA/CA. A mechanism generally accepted in the art to address this is the use of a two-way handshake using a Request to Send ("RTS") message and Clear To Send ("CTS") message with network allocation vectors in each message. The use of RTS/CTS in a network, while addressing the hidden node problem, substantially reduces the capacity of the network. Moreover, it does not address many of the other scenarios under which CSMA/CA will perform sub-optimally.

As a CSMA/CA network can be operated with larger distances between nodes, the protocol needs to be altered to provide sufficient gaps in transmissions to ensure that there is no overlap. The IEEE 802.11g standard, used for example, to create an in-home wireless computer network, and an example of a CSMA/CA protocol, calls for 9.6 μsec between the end of one discrete time slot and the beginning of the next slot. The concept of time slots allows several nodes to transmit on the same frequency channel by transmitting at their own times, or time slots. This 9.6 μsec time was chosen to support the propagation delay between nodes, the spread of the waveform over a multi-path environment (where transmissions can follow any of a number of paths from one node to another), the computational time to decode the information transmitted in a slot, and timing margin to simplify the implementation. As the network is extended from, for example a 100 meter separation between nodes to a 5 km separation to a 50 km separation, the round-trip propagation time grows from 66 nsec, to 3.2 μsec, to 32 μsec. In order for a CSMA/CA protocol to operate properly over these distances, the size of the gaps between transmissions needs to be extended, also reducing the efficiency of the protocol.

Various approaches have been researched to scale the capacity of wireless networks. The CSMA/CA protocol essentially divides the total capacity (C) among the nodes, so the per-node capacity at node i, $c(i)$, shrinks as the number of nodes, N, increases, according to the equation $c(i)=C/N$. In other words, since the total capacity remains the same, as the number of nodes increases, each individual node's capacity decreases. This is driven by a fundamental assumption that CSMA/CA is designed upon that all nodes must take turns sharing the available capacity.

The capacity (C) of a network can be spatially divided into non-overlapping regions. To achieve a number k independent regions among the physical area covered by the network, the capacity per node $c(i)$ would increase by a factor of k, according to the equation $c(i)=k*C/N$. However, such a media access control mechanism does not work well for a highly-dynamic collection of nodes. Beam-forming antennas, which can transmit signals directionally, can be used for creating these k independent regions. Although beam-forming could provide for better separation of regions, it exacerbates the problem that CSMA/CA has since it does not have a uniform channel between all the nodes in a neighborhood. Protocols that use a form of time-division multiple access ("TDMA") mechanism and pass control of the channel from one node to another work poorly when faced with a "fast-mover" node (e.g., a cell phone in a car on the expressway) that traverse many neighborhoods rapidly. Using beam-forming approaches also generally requires adding the concept of state to the protocol, which requires more management exchanges and lengthening of the time for the neighborhood to adjust to any changes in the population. This additional overhead reduces capacity and efficiency.

Aspects and embodiments disclosed herein are directed to addressing/solving these and other needs.

SUMMARY OF THE INVENTION

According to an aspect of the invention, a method includes receiving at a synchronizing node a first reference frame from a first reference node at a first time and storing a first time value representing the first time, and calculating a timing estimator by subtracting a minimum time value, representing the distance from the synchronizing node to the first reference node, from the first time value. The method also includes receiving at the synchronizing node a second reference frame at a second time and storing a second time value representing the second time, and transmitting from the synchronizing node to the first reference node a short timing contention time frame. The method also includes receiving at the synchronizing node from the first reference node an arrival time value representing the time at which the first reference node received the short timing contention time frame and calculating a first time drift from the first arrival time value and the second time value. The method also includes adjusting the timing estimator based on the first time drift and transmitting from the synchronizing node a frame according to a timing determined from the timing estimator.

According to another aspect of the invention, a method includes receiving at a first node a plurality of frames from a plurality of reference nodes, measuring and recording frame timing values for each the plurality of frames representing the arrival times of the plurality of frames, and calculating carrier frequency offset values for each of the plurality of frames. The method also includes determining an average carrier frequency offset value of the plurality of frames, adjusting a local oscillator at the synchronizing node, and transmitting a frame to the plurality of reference nodes. The method also includes receiving second frame timing values from the plurality of reference nodes representing the times the respective reference nodes received the short timing contention frames and determining an average time drift for the arrival time values, wherein the time drift for each of the plurality of reference nodes equals: (second timing value−timing value)/2. The method also includes adjusting the frame timing according to the average time drift and transmitting data from the synchronizing frame according to the estimated frame timing.

According to another aspect of the invention, a method includes receiving at a first node a plurality of signals from a plurality of nodes, determining a plurality of carrier frequencies for the plurality of nodes and determining a consensus of the plurality of carrier frequencies. The method also includes adjusting a local oscillator at the first node to match the consensus and transmitting data from the first node to one of the plurality of nodes according to timing determined by the local oscillator.

According to another aspect of the invention, a computer-readable medium is encoded with a data structure. The data structure includes three identical preambles, a plurality of channel state information estimation fields, and a data field.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings. The same reference numerals and/or other reference designations employed throughout the ensuing drawings are used to identify identical components, except as provided otherwise.

FIG. 2 is a block diagram of a MSA slot in accordance with some aspects of the disclosure;

FIG. 3 is a block diagram of a short timing contention slot in accordance with some aspects of the disclosure;

DETAILED DESCRIPTION OF THE PREFERRED EMBODIMENTS

Figure 1:
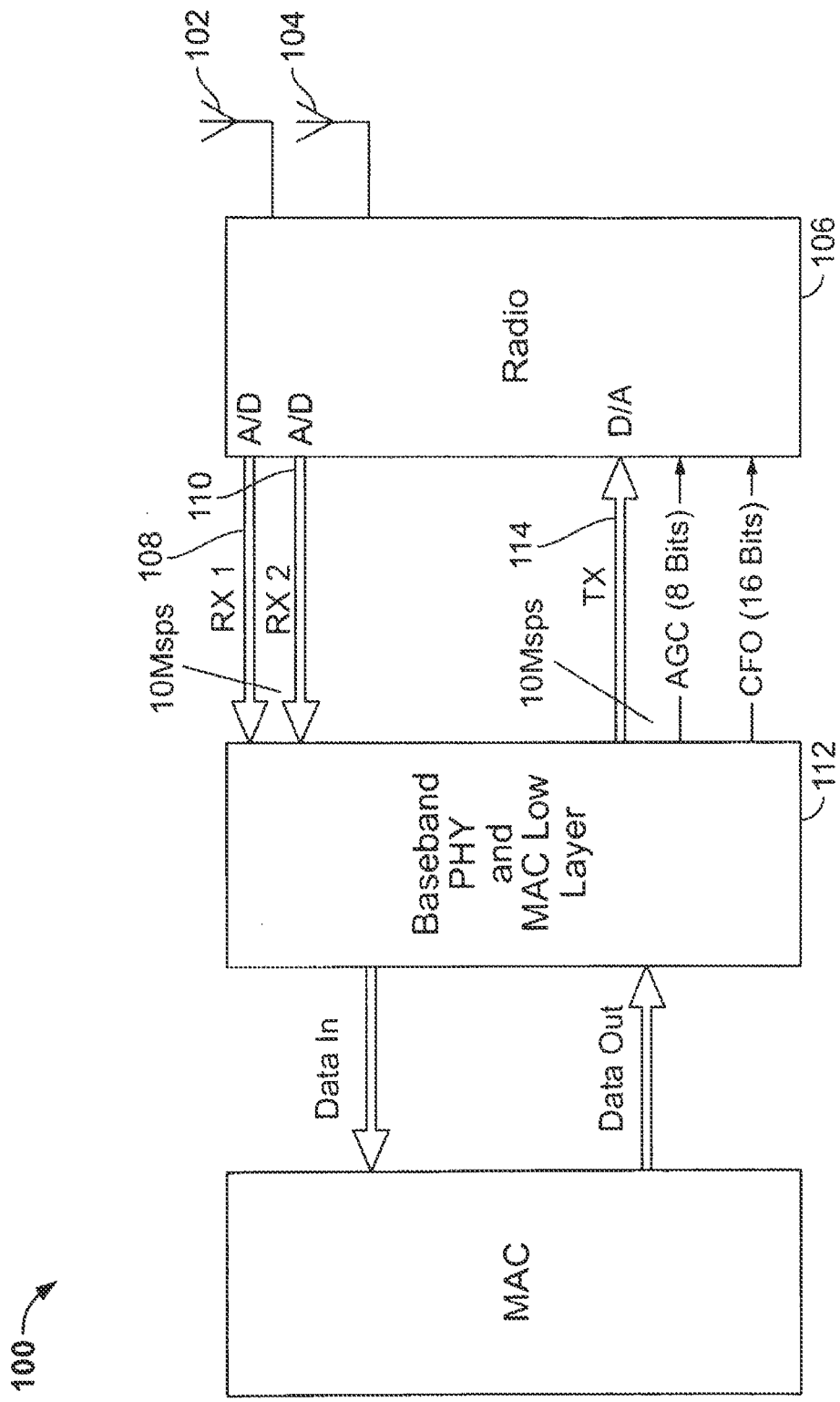
FIG. 1 is a block diagram of a system in accordance with some aspects of the disclosure.

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

According to the invention, multiple simultaneous transmissions from a distributed collection of nodes can be supported with no centralized controller. Multiple input, multiple output ("MIMO") technology, where both a transmitter and a receiver have multiple antennas for communicating over a point to point link (e.g., as included in the IEEE 802.11n standard) can be modified to operate in a fully-distributed fashion (as in the Slotted ALOHA protocol). The resulting waveform can be referred to as MIMO Slotted ALOHA ("MSA").

When a new node, or synchronizing node, attempts to join a network (e.g., a handheld radio attempts to join a network of other handheld radios), the synchronizing node initially listens and does not transmit. This synchronizing node, listens for transmissions from other nodes in order to synchronize with the slotted access mechanism. In other words, the synchronizing node listens to determine how and when the other nodes are communicating. If it does not hear any transmissions for some time, it creates slot times based on its own internal clock, or oscillator.

If the synchronizing node hears (receives a signal from) other neighboring nodes, it computes the carrier frequency offset ("CFO") of the transmitter, to adjust its local oscillator. Each of the nodes is supposed to be transmitting at the same frequency, however, there are variations. Thus, the synchronizing node must determine how much the actual received frequency is offset from the expected frequency. The synchronizing node uses a filter to adjust the local oscillator to match the consensus of the transmission frequencies of the neighboring nodes. As long as all of the nodes use this same approach, they can converge the carrier frequencies of their respective oscillators to the same relative frequency. The synchronizing node's slot times are derived from the bit-rate of the system, which is controlled by the synchronizing node's local oscillator. Once the synchronizing node's oscillator has roughly converged to the same frequency as the other nodes in the network, the synchronizing node will compute the periodicity of the slots with similar accuracy.

Once slot periodicity is controlled, the synchronizing node must track the phase of these slots to align the edges of the slots with the other nodes in the network. In other words, the synchronizing node must determine where the beginnings of the slots are in order to transmit information at the right times. To accomplish this, each receiver measures the average phase of the transmissions from the neighboring nodes and the epoch of the slots from other nodes to determine slot phase offsets for the transmissions from each of the neighboring nodes. Each node also announces its measure of the slot phase offset of other nodes to allow the other nodes to converge on a single known target slot phase.

Within a slot time, each node needs to determine when to transmit. Each node has a single transmitter, and has a number $N_{RX}$ of receivers (and, when the number of receivers is known, the system is said to be an MSA-n system; e.g., if the nodes each have four receivers, the system is said to be an MSA-4 system). Using MIMO techniques, a node's receiver is capable of receiving up to $N_{RX}$ simultaneous transmissions, assuming that there is a unique channel between each transmitter and each receiver. According to the IEEE 802.11n specification, there is generally a unique channel between all transmitters and receivers when the antennas are separated by at least a ¼ wavelength. The MSA technique separates the transmitter antennas by substantially more than this, as the transmitters are geographically dispersed. An MSA node should still have $N_{RX}$ antennas for its receivers and the antennas should be separated by at least a ¼ wavelength to create distinct channels between two receivers from the same source antenna.

An MSA slot structure (the information that is transmitted in a time slot) starts with a preamble that is repeated three times. The first instance of the preamble is used to allow the receivers to adjust their automatic gain controls ("AGC") and measure the received slot time. The second two preambles are used to estimate the carrier frequency offset among all the transmitters. Each node is expected to have a local oscillator that is tracking the neighborhood average carrier frequency. However, some drift should be expected. Within the neighborhood, each node randomly selects a tone from a collection of possible tones. These tones are complex, and are used to identify indices of transmitters within the system during any given slot. Once the indices of the nodes are known, channel state information can be computed.

If a node hears another node use the complex tone it has selected, the node can simply pick a new complex tone from the set of possible complex tones in the system. If the node determines that it has heard more than $N_{RX}$ complex tones, it will determine that the slot has a collision and will not attempt to process the information from that slot further.

As part of processing the preamble, the node's receiver can determine an indication of the number of transmitters that have transmitted data in this slot. The node will also be able to accumulate an estimate of the number of distinct nodes in the neighborhood. The node can use this information to estimate the load in terms of both the number of active nodes and a total offered load on the neighborhood. These estimates are used to control the rate at which any particular node attempts to transmit in slots in a channel.

MSA can use orthogonal frequency-division multiplexing ("OFDM"), scheme for multiplexing information from several transmitters into a single channel. Channel state information ("CSI") needs to be determined to perform OFDM modulation. In the frequency domain, OFDM information is represented as a series of complex tones, each of which has an amplitude and phase. A receiver must estimate these in order to interpret received information. The channel state information can be represented by a mathematical value H(f). A transmitter can send a known tone to a receiver. From this known tone, the receiver can calculate the H(f) information. The receiver then knows the channel state information and can interpret further information from the transmitter. In order to operate a MIMO system, a receiver in a MIMO system must be able compute the CSI between itself and all of the transmitters in the system. Similar to that specified by IEEE 802.11n standard, a node following the MSA protocol computes channel state information based on a preamble transmitted at the beginning of each time slot. However, unlike the IEEE 802.11n protocol, the MSA protocol uses a slotted approach, rather than a CSMA/CA approach, to control when a specific node can access the network.

The MSA protocol can use a rate-controlling medium access controller ("MAC") protocol. Each node in the network offers packets to the network probabilistically, with no memory between slots. Each node works to load the network to the natural optimal load. An MSA system where each node has 4 receivers, MSA-4, as an example, has a natural optimal value of 4/N_node (optimal in terms of the number of slots used to support a specific successful transmission of slots, assuming a zero-bandwidth, perfect knowledge of which slots were successfully delivered to a receiver).

The provision upper MAC functions, e.g., acknowledgment of slots, can be deferred to protocols such as OBX.

Among other benefits, the MSA protocol provides:
a fully distributed MIMO system that does not require any central coordination for proper operation;
a mechanism for adjusting the earlier frequency offset among a set of nodes that are simultaneously transmitting;
a mechanism for adjusting the phase of a slotted ALOHA system to support multiple simultaneous transmitting nodes;
a mechanism to determine the number of nodes in a neighborhood while the nodes are simultaneously accessing the same channel in the same operating frequency;

a mechanism to determine a channel state information matrix among a set of physically separated transmitting nodes with no pre-configured state;

a mechanism to allocate unique identification information among transmitting nodes without a dedicated control channel;

a mechanism to quickly control access to the time slots within a slotted system that allows for multiple users and maintains the average load, as measured in users/slot, below a target threshold; and a mechanism with minimal state that supports rapid addition and removal of nodes in the operating neighborhood.

The CSMA protocol outperforms the single input single output ("SISO") Slotted Aloha protocol. The MSA protocol, however, can significantly increase the system throughput with much smaller system delay compared to CSMA. MSA can easily and quickly adapt to a dynamic wireless network. Moreover, MSA does not have the hidden node problem in a wireless network.

The Open Systems Interconnect ("OSI") model is commonly used to define the flow of data, or "network traffic," over a network between network applications and/or devices. The OSI model has seven layers including the data link layer ("Layer-2"), and the physical layer ("Layer-1"). Each OSI layer communicates with a layer above and/or below it and with corresponding layer(s) on other applications and/or devices in the network through specific protocols. A physical layer ("PHY") specifies how information is converted to physical signals that are transmitted over the transmission medium, and can specify several techniques for increasing the rate and reliability of the wireless link. Table 1 illustrates an exemplary physical layer feature set for implementing a physical layer protocol. Table 2 illustrates exemplary parameters related to MIMO orthogonal frequency division multiplexing ("OFDM").

TABLE 1

PHY Feature Set

| Feature | Mandatory | Optional |
|---|---|---|
| Number of Transmit Antennas | 1 | |
| Number of Receive Antennas | 2/4 | |
| Channelization bandwidth | 5 MHz | |
| Number of Occupied Subcarriers | 204 in 5 MHz | |
| Number of Data Subcarriers | 196 | |
| Number of Pilot Subcarriers | 8 | |
| Modulation Order | 64-QAM | |
| Convolution Code Rate | 3/4 | |
| Guard Interval | 64 samples, 12.8 uses | |
| Convolutional Coding | $R = 1/2, K = 7, (g_1 = 133_8, g_2 = 171_8)$ | |
| Turbo | | Optional |

TABLE 2

MIMO OFDM Related Parameters

| Parameter | Value for 5 MHz Channel |
|---|---|
| $N_{RX}$: Number of Receive ("RX") Antennas | 2/4/6 |
| $N_{TX}$: Number of Transmit ("TX") Nodes | 1, 2, . . . Nrx |
| $N_{SD}$: Number of data subcarriers | 196 |
| $N_{SP}$: Number of pilot subcarriers | 8 |
| $N_{SN}$: Number of center null subcarriers | 1 |

TABLE 2-continued

MIMO OFDM Related Parameters

| Parameter | Value for 5 MHz Channel |
|---|---|
| $N_{SR}$: Subcarrie range (index range) | 0:255 |
| $T_{FFT}$: inverse fast Fourier transform fast Fourier transform ("IFFT/FFT") period | 51.2 μsec |
| $T_{GI}$: Guard Interval ("GI") Duration | 12.8 μsec, 64 samples |
| $T_{SYM}$: Symbol interval | 64.0 μsec |
| T: Nyquist sampling interval | 200 nsec |

A MAC layer is an OSI "Level 2" protocol that provides parameters for several nodes to communicate with each other on a multipoint network. The MAC layer specifies several techniques for increasing the rate and reliability of the wireless link, as understood by a person of ordinary skill in the art.

Table 3 list exemplary performance requirements for a MSA system.

TABLE 3

System Specifications and Requirements for MSA2

| Parameter | Value | Justification Description |
|---|---|---|
| RX sensitivity | −78.0 dBm | PER<10% for 2 streams |
| Noise Figure | 3 dB | |
| Maximum input level | −30 dBm | |
| Adjacent channel rejection | 16 dB | |
| Non-adjacent channel rejection | 32 dB | |
| Carrier frequency offset tolerance | +/−0.1 ppm | Accuracy on system clock is +/−0.1 ppm, RX + TX freq. Error = 0.2 ppm |
| Sampling clock frequency offset tolerance | +/−0.1 ppm | Symbol clock is tied to system clock |
| RMS delay spread tolerance | 1.5 μs | Including all TX/TX delay |
| Receiver DC offset tolerance | N/A | |
| Transmitter EVM | −25 dB | |
| TX antenna gain | 2.2 dB | |
| RX antenna gain | 2.2 dB | |
| Total TX/RX loss | <2 dB | |
| Carrier suppression | −15 dBc | |
| Minimum transmit power | 20 dBm | Per Node |
| Maximum transmit power | 33 dBm | Per Node |
| Transmit center frequency tolerance | +/−0.1 ppm | |
| Gain setting time | <0.2 μs | |
| Freauency control setting time | <2 μs | |

FIG. 1 shows a high-level diagram of a MSA system 100. A MSA(Nrx) system includes a MIMO receiver with a number Nrx receiver antennas. The MSA system 100 is shown as a MSA-2 system, as it includes a radio 106 with two receiver antennas 102, 104. The radio 106 of the MSA system 100 also includes a TX antenna (not shown). The MSA system includes Nrx RX streams (here, two RX streams 108, 110) representing the communication of data from the radio 106 to PHY and MAC Low layers 112. The MSA system 100 includes one TX stream 114 representing communication of data from PHY and MAC Low layers 112 to the radio 106. The TX stream 114 can include two slot types, a MSA slot and a short timing contention ("STC") slot.

FIG. 2 shows the MSA slot structure 200. The slot structure is the logical organization of the information that is transmitted at a particular time (i.e., in that particular time slot). Each slot includes three 64 samples long frequency tone fields ("FTF") 210, 212, 214, Nrx CSI fields (one CSI field for each receiver; the first CSI field 216 and the last CSI field 218 are shown), 8 OFDM data symbols 220 and a 13 µsec long separation field 222. The first frequency tone field 210 is used for the automatic gain control and timing estimation. The second and third frequency tone fields 212, 214 are used for carrier frequency offset estimation, node index detection and signal to noise ratio ("SNR") SNR estimation.

FIG. 3 shows a short timing contention slot structure 300. The short timing contention slot 300 is transmitted by a newly joining node in order to synchronize with the rest of the nodes in a MSA network. The short timing contention slot 300 includes two frequency tone fields 310, 312.

Figure 4:
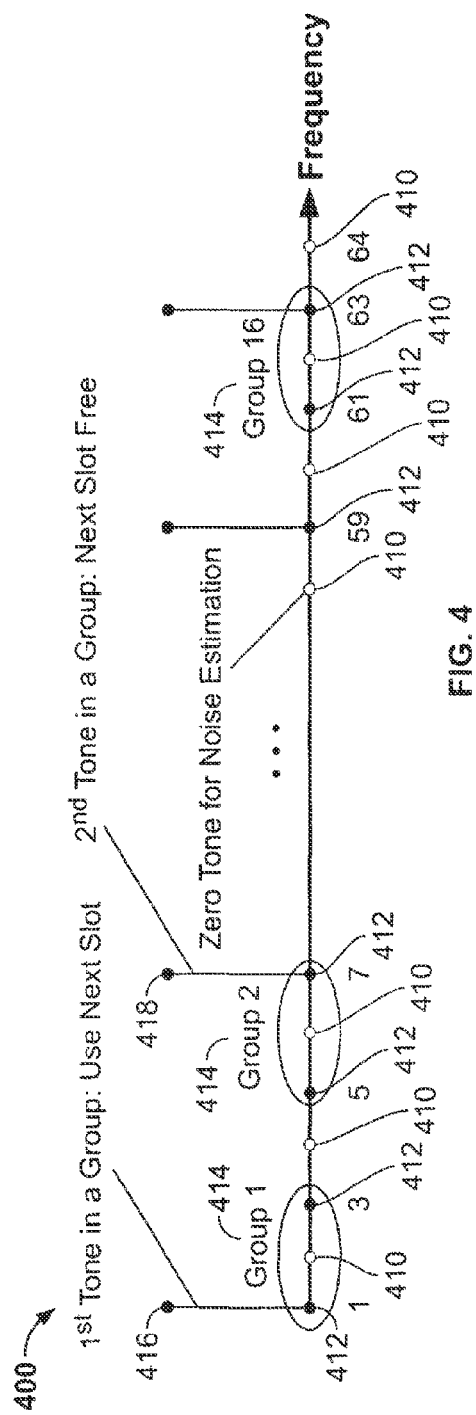
FIG. 4 is a diagram of a short timing contention slot in accordance with some aspects of the disclosure.

FIG. 4 shows a frequency tone field 400 in a frequency domain. The frequency tone field 400 has 64 tones, with an even number of zero tones 410. The 32 odd number tones 412 are group into 16 node groups 414 with each group having two non-zero tones. A group represents one node index. 16 groups allow 16 nodes in one neighborhood. Two tones in each group 416, 418 indicate the next slot usage. Next slot will be used if the 1$^{st}$ tone 416 is set, otherwise the 2$^{nd}$ tone 418 is set. The receiver noise power can be estimated by analyzing the 32 zero tones. The frequency tone field signal is a complex tone that can be represented by:

$$s_{FTF}(n) = \frac{\exp(j \cdot 2\pi f_m \cdot nT_s)}{\sqrt{320}}, \quad \text{[Equation 1]}$$
$$n = 0, 1, \ldots 63$$

where $f_m$=1, 3, 5, . . . 63 is the tone selected by a node, and $T_s$ is the sampling interval (e.g., 0.2 µsec).

With reference to FIG. 2, three identical frequency tone fields 210, 212, 214 are transmitted in one slot. The first frequency tone field 210 serves as the guard interval of the rest of frequency tone fields 212, 214. It is also used for automatic gain control and slot timing detection. The last two frequency tone fields 212, 214 are used for SNR estimation and Node Index detection. The carrier frequency offset is also estimated over these two identical frequency tone fields.

Figure 5:
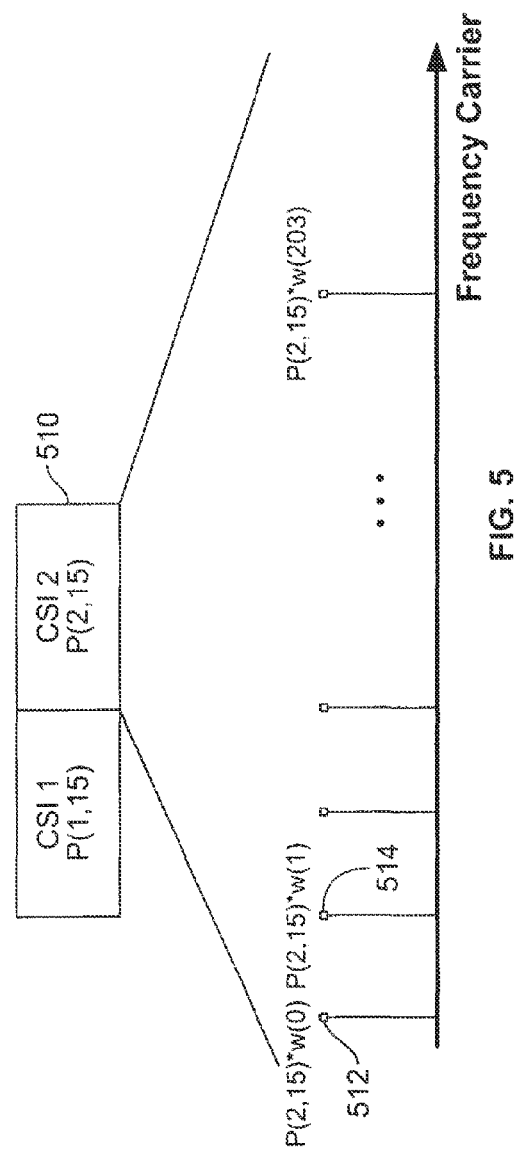
FIG. 5 is a diagram of a frequency tone field in accordance with some aspects of the disclosure.

The Nrx CSI fields 216, 218 are needed for up to Nrx by Nrx CSI matrix estimation. For a distributed MIMO, each node has to send a unique CSI field, which is indexed by the frequency tone field node index tone. As shown in FIG. 5, the k-th sub-carrier in i-th CSI field is modulated by P(i,j)*w(k), where P(i,j) is a complex constant, i is the CSI index and j is the j-th node index. For example for the 15th node, subcarrier 0 in CSI field 2 510 is modulated by P(2,15)*w(0) 512, subcarrier 1 in CSI field 2 is modulated by P(2,15)*w (1) 514, etc. w(k) is a known fixed random sequence and k is the frequency carrier index (k=0, 1, . . . 203 in this case). Table 4 shows example CSI values.

TABLE 4

| | MSA2 CSI values P(i, j) | |
|---|---|---|
| | i = 1 | i = 2 |
| j = 1 | 0.7071 − 0.7071i | 0.7071 − 0.7071i |
| j = 2 | 0.7071 + 0.7071i | 0.7071 − 0.7071i |
| j = 3 | −1.0000 + 0.0000i | −0.7071 + 0.7071i |
| j = 4 | −0.7071 + 0.7071i | 0.7071 − 0.7071i |
| j = 5 | 0.7071 − 0.7071i | 1.0000 |
| j = 6 | −0.0000 − 1.0000i | 0.0000 + 1.0000i |
| j = 7 | −0.7071 + 0.7071i | −0.0000 − 1.0000i |
| j = 8 | 1.0000 | −0.7071 − 0.7071i |
| j = 9 | −0.0000 − 1.0000i | 0.7071 + 0.7071i |
| j = 10 | −0.7071 + 0.7071i | 0.7071 + 0.7071i |
| j = 11 | −1.0000 + 0.0000i | 0.7071 + 0.7071i |
| j = 12 | −0.0000 − 1.0000i | −1.0000 + 0.0000i |
| j = 13 | 0.7071 − 0.7071i | 0.0000 + 1.0000i |
| j = 14 | −0.7071 − 0.7071i | 0.7071 + 0.7071i |
| j = 15 | −0.7071 − 0.7071i | −0.0000 − 1.0000i |
| j = 16 | −0.7071 + 0.7071i | −0.7071 − 0.7071i |

Figure 6:
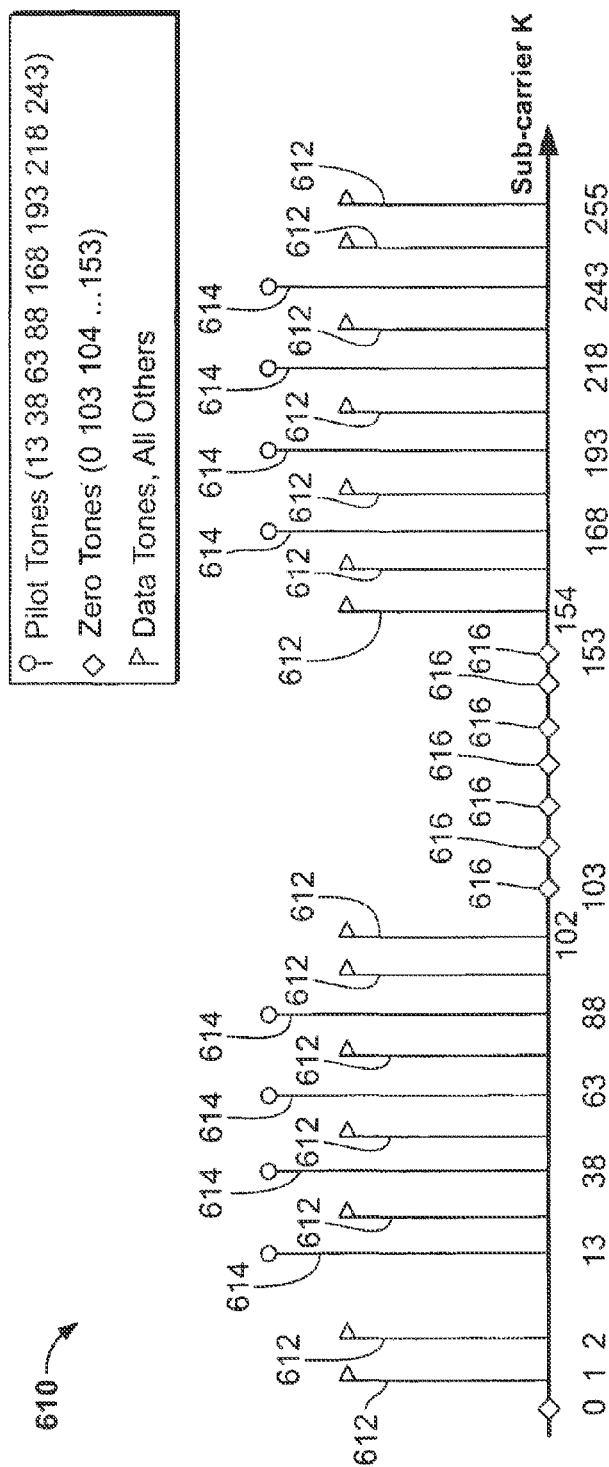
FIG. 6 is a diagram of a logical tone format in accordance with some aspects of the disclosure.

An example 204 value long random sequence for w(k), where k=0, 1, 2, . . . 203 is:
0.7071−0.7071i 0.7071+0.7071i −1.0000+0.0000i −0.7071+ 0.7071i 0.7071−0.7071i −0.0000−1.0000i −0.7071+0.7071i 1.0000−0.0000−1.0000i −0.7071+0.7071i −1.0000+0.0000i −0.0000−1.0000i 0.7071−0.7071i −0.7071−0.7071i 0.7071+ 0.7071i −0.7071+0.7071i 0.7071−0.7071i 0.7071−0.7071i −0.7071+0.7071i 0.7071−0.7071i 1.0000+0.0000+1.0000i −0.0000−1.0000i 1.0000 0.7071+0.7071i 0.7071+0.7071i 0.7071+0.7071i −1.0000+0.0000i 0.0000+1.0000i 0.7071+ 0.7071i 1.0000−0.7071−0.7071i −0.7071+0.7071i 0.7071− 0.7071i −0.7071+0.7071i −0.7071+0.7071i −0.0000− 1.0000i −1.0000+0.0000i 0.7071−0.7071i −0.7071−0.7071i −0.0000−1.0000i 1.0000−0.7071−0.7071i −0.7071+0.7071i −0.0000−1.0000i −1.0000+0.0000i −0.7071−0.7071i −0.7071+0.7071i 0.0000+1.0000i 0.7071−0.7071i 0.7071+ 0.7071i −0.7071−0.7071i 0.0000+1.0000i −1.0000+0.0000i 0.7071+0.7071i −0.7071−0.7071i −0.7071+0.7071i −0.0000−1.0000i −0.0000−1.0000i −1.0000+00000i −07071+07071i 0.7071−0.7071i −0.0000−10000i −0.7071− 0.7071i −0.0000−1.0000i −0.7071−0.7071i 0.0000+1.0000i 0.0000+1.0000i 0.0000+1.0000i −1.0000+0.0000i −0.7071− 0.7071i 0.0000+1.0000i −0.0000−1.0000i −1.0000+1.0000i 0.0000+1.0000i −07071i −0.7071i −1.0000+0.0000i −0.7071 0.7071i −0.7071−0.7071i −1.0000+0.0000i −0.0000−1.0000i 0.7071−0.7071i −1.0000+00000i 0.7071− 0.7071i 0.7071+0.7071i 0.7071−0.7071i 0.0000+1.0000i 0.0000+1.0000i 0.7071−0.7071i −0.7071−0.7071i 0.7071+ 0.7071i 1.0000 0.7071−0.7071i 0.7071−0.7071i 0.0000+ 1.0000i −0.7071−0.7071i 0.0000+1.0000i −0.7071+0.7071i 1.0000 0.7071−0.7071i −1.0000+0.0000i −0.7071−0.7071i −1.0000+0.0000i 0.0000+1.0000i −0.7071+0.7071i 0.7071+ 0.7071i −1.0000+0.0000i −0.0000−1.0000i −1.0000+ 0.0000i −0.7071−0.7071i 0.7071+0.7071i −0.7071−0.7071i −0.0000−1.0000i −0.7071−0.7071i −07071+0.7071i −1.0000+0.0000i −0.0000−1.0000i 1.0000−1.0000+0.0000i 1.0000−0.7071+0.7071i 0.0000+1.0000i −0.0000−1.0000i 1.0000−0.0000−1.0000i 0.7071−0.7071i 0.7071−0.7071i −0.0000−1.0000i −0.7071+0.7071i −0.7071+0.7071i 0.7071+0.7071i −0.7071−0.7071i 0.0000+1.0000i 0.7071− 0.7071i −0.7071−0.7071i −0.7071+0.7071i −0.7071− 0.7071i 0.0000+1.0000i −0.7071+0.7071i −0.7071−0.7071i −0.7071−0.7071i 0.7071+0.7071i −0.0000−1.0000i −0.7071−0.7071i 0.7071+0.7071i 0.7071+0.7071i −1.0000+ 0.0000i −0.7071−0.7071i 0.0000+1.0000i −1.0000+0.0000i −0.7071+0.7071i 1.0000 1.0000 0.0000+1.0000i 1.0000− 0.7071+0.7071i −0.7071−0.7071i 1.0000 1.0000−1.0000− 0.0000i −1.0000+0.0000i 1.0000 1.0000 0.7071+0.7071i −1.0000+0.0000i 1.0000 0.0000+1.0000i −0.7071−0.7071i −0.7071−0.7071i −0.7071−0.7071i 1.0000−0.7071+0.7071i −0.7071+0.7071i 0.0000+1.0000i 0.7071+0.7071i −0.7071− 0.7071i −0.7071−0.7071i −0.7071−0.7071i −0.7071+ 0.7071i −1.0000+0.0000i 1.0000−0.7071+0.7071i −0.7071− 0.7071i 0.7071−0.7071i 0.0000+1.0000i 0.0000+1.0000i −0.0000−1.0000i 0.7071+0.7071i −0.0000−1.0000i 0.7071− 0.7071i 0.7071+0.7071i 0.7071+0.7071i 1.0000 1.0000− 0.7071−0.7071i 0.7071+0.7071i −0.0000−1.0000i 0.7071+ 0.7071i 0.7071+0.7071i 0.7071−0.7071i −0.7071+0.7071i 0.0000+1.0000i 0.0000+1.0000i 0.0000+1.0000i FIG. 6 shows a logical tone format for 5 MHz channelization. This is an example of a signal transmitted by the transmitter. A CSI 610 has 196 data tones 612, 8 pilot tones 614 and 52 zero tones 616. The j-th Node picks two CSI values and P(1,j) and P(2,j) from Table 4. The non-zero tones in first CSI field can be represented by:

$$CSI(1,k)=P(1,j)*w(k-1), \text{ where } k=1,2,\ldots 102 \quad \text{[Equation 2]}$$

$$CSI(1,k)=P(1,j)w(k-52), \text{ where } k=154,155,\ldots 255 \quad \text{[Equation 3]}$$

The remaining CSI fields can be represented similarly, with P(i,j), i=1,2, . . . Nrx:

$$CSI(i,k)=P(i,j)*w(k-1), \text{ where } k=1,2,\ldots 102 \quad \text{[Equation 4]}$$

$$CSI(i,k)=P(i,j)*w(k-52), \text{ where } k=154,155,\ldots 255 \quad \text{[Equation 5]}$$

The frequency domain CS(1,k) and CSI(2,k) can be converted to the time domain by taking complex 256-iFFT ("fast Fourier transform"):

$$CSI(i,n)=iFFT(CSI(i,k)), \text{ where } n=0,1,\ldots 255, i=1,2,\ldots Nrx \quad \text{[Equation 6]}$$

64 GI samples are inserted to form a 320 samples CSI field.

Figure 7:
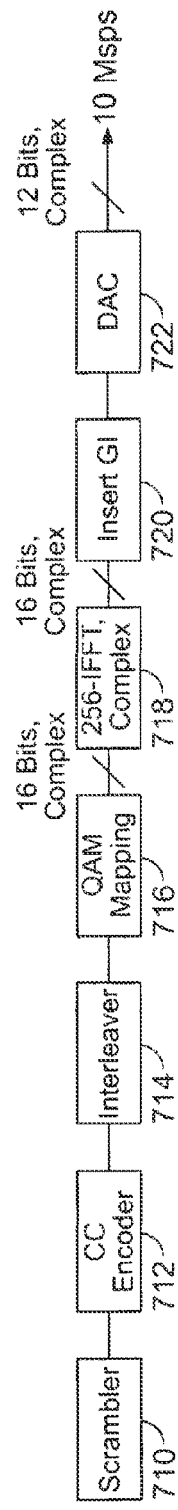
FIG. 7 is a block diagram of a OFDM symbol transmitter in accordance with some aspects of the disclosure.

A node can transmit information using a OFDM symbol transmitter. FIG. 7 shows a block diagram of a OFDM symbol transmitter 700. Each slot includes 8 OFDM symbols. The OFDM symbol transmitter 700 includes a scrambler 710, a convolutional encoder 712, an interleaver 714, a quadrature amplitude modulation ("QAM") mapper 716, a complex 256-iFFT mapper 718, a guard interval insertion block 720, and a digital to analog converter ("DAC") 722. The components of the OFDM symbol transmitter can include one or more processors (e.g., microprocessors, digital signal processors ("DSP"), field programmable gate arrays ("FPGA"), etc.) and memory. Their functions can be performed in hardware, in software executing on the processors, or combinations of hardware and software.

A OFDM symbol includes 876 information bits. One block of bits is scrambled by the 802.11g scrambler 710. The transmitted data is scrambled to prevent long strings of ones and zeros. A generator polynomial defining the operation of the scrambler 710 is:

$$S(x)=x^7+x^4+1 \quad \text{[Equation 7]}$$

The initial state is a set of seven ones (1111111).

Figure 8:
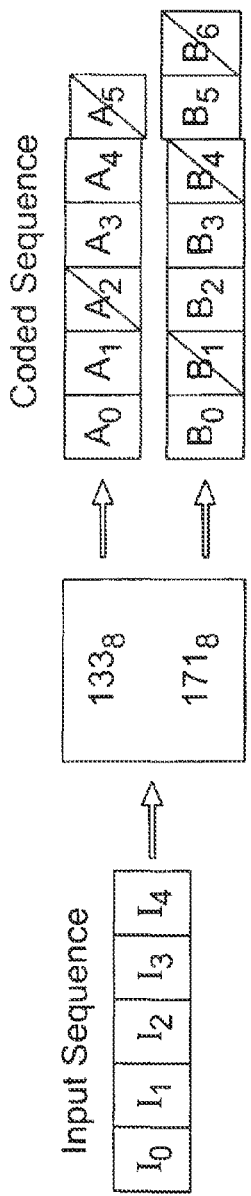
FIG. 8 is block diagram of a convolutional encoder in accordance with some aspects of the disclosure.

The DATA field (FIG. 2, 220) can be punctured and coded with the convolutional encoder 712, which can have, for example, a coding rate R=½ or R=¾. The encoding can improve forward error control and hence improve the hit error rate. FIG. 8 illustrates puncturing patterns for a coding rate of R=¾. Six tail bits with values of zero can be added to the 876 information bits to form a 882 bits long input block. Referring back to FIG. 7, the output of the encoder 712 is a 1176 bits long block.

Before transmission, the transmitted data can be interleaved by the interleaver 714. In interleaving, the data is transmitted out of order, so that if a portion of the data is corrupted during transmission, the corrupted data will be spread out throughout a frame, and will be easier to correct. The interleaver 714 interleaves the 1176 bits long block by two permutations:

$$i=84 \cdot \text{mod}(n,14)+\text{floor}(n/14), n=0,1,\ldots 1175 \quad \text{[Equation 8]}$$

$$j=3 \cdot \text{floor}(i/3)+\text{mod}\ [i+1176-\text{floor}(14 \cdot i/1176),3], i=0,1,\ldots,1175 \quad \text{[Equation 9]}$$

The bit interleave is a n to j index transformation. This transformation can be implemented by a look up table ("LUT") method.

After interleaving, the 1176 bits data block can be grouped into 196 6-bit blocks. The QAM mapper 716 can perform 64-QAM modulation on the 6-bit blocks. For every 6-bit [$b_0\ b_1\ b_3\ b_4\ b_5$] block, the 64-QAM modulation is:

$$I = \frac{1}{\sqrt{42}}b_0[4-b_1(2-b_2)] \quad \text{[Equation 10]}$$

$$Q = \frac{1}{\sqrt{42}}b_3[4-b_4(2-b_5)] \quad \text{[Equation 11]}$$

Information bit b equals +/−1. There are 196 data tones:

$$X(k)=I(k)+j*Q(k)\ k\in\text{Data Tones} \quad \text{[Equation 12]}$$

196 64-QAM symbols are placed on 196 data tones as shown in FIG. 6 (non-zero tones excluding pilots).

For the MIMO-OFDM operation in 5 MHz bandwidth, each OFDM symbol can be constructed from 256 tones, of which 196 are data tones 612, 8 are pilot tones 614 and 52 are zero tones 616, as shown in FIG. 6. The 8 pilot tones 614 are BPSK modulated at (13 38 63 88 168 193 218 243). Their BPSK values are P(k)=(1 −1 −1 −1 1 1 1 −1). The frequency domain tone X(k) and P(k) together are converted to the time domain by the complex 256-iFFT mapper (FIG. 7, 718).

Figure 9:
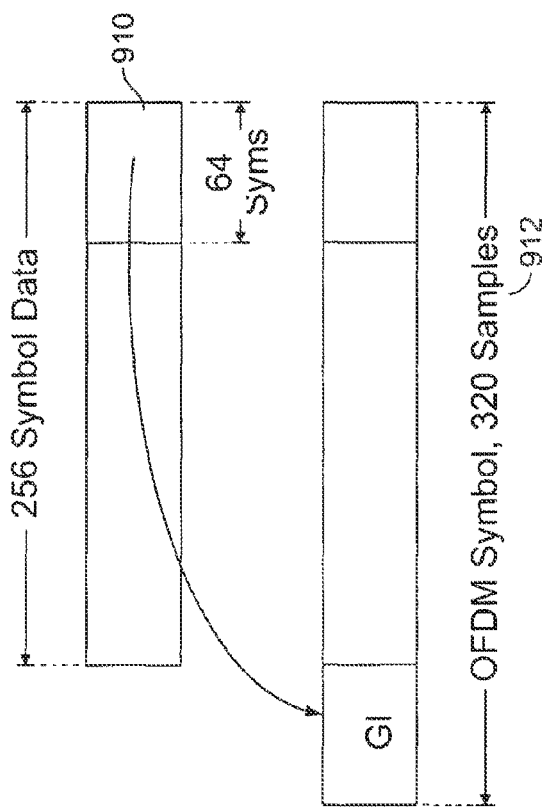
FIG. 9 is a block diagram illustrating guard interval insertion in accordance with some aspects of the disclosure.

As shown in FIG. 9, a cyclic prefix of 64 samples (12.8 μsec) 910 is added to the time domain by the guard interval insertion module (FIG. 7, 720) to generate a symbol of 320 samples 912. The guard interval is used to ensure that signals from one symbol are not confused with signals from another symbol. The long GI duration is used to protect the nodes with long distance, 12.8 μsec GI can tolerate maximum distance of 3.84 Km.

An interpolation filter can be used to suppress the interpolation image. The interpolation filter is a 13-tap square-root raised Cosine filter with α=0.3. Its behavior is determined based on the equation:

$$x(n) = \sum_{m=-N/2}^{N/2} h(m)s(n-m) \quad \text{[Equation 13]}$$

The filter coefficients are shown in Table 5.

TABLE 5

Transmit interpolation filter

| n | h(n) |
|---|---|
| −6, 6 | −0.0234 |
| −5, 5 | 0.0318 |
| −4, 4 | 0.04 |
| −3, 3 | −0.1086 |
| −2, 2 | −0.053 |
| −1, 1 | 0.4351 |
| 0 | 0.7651 |

Figure 10:
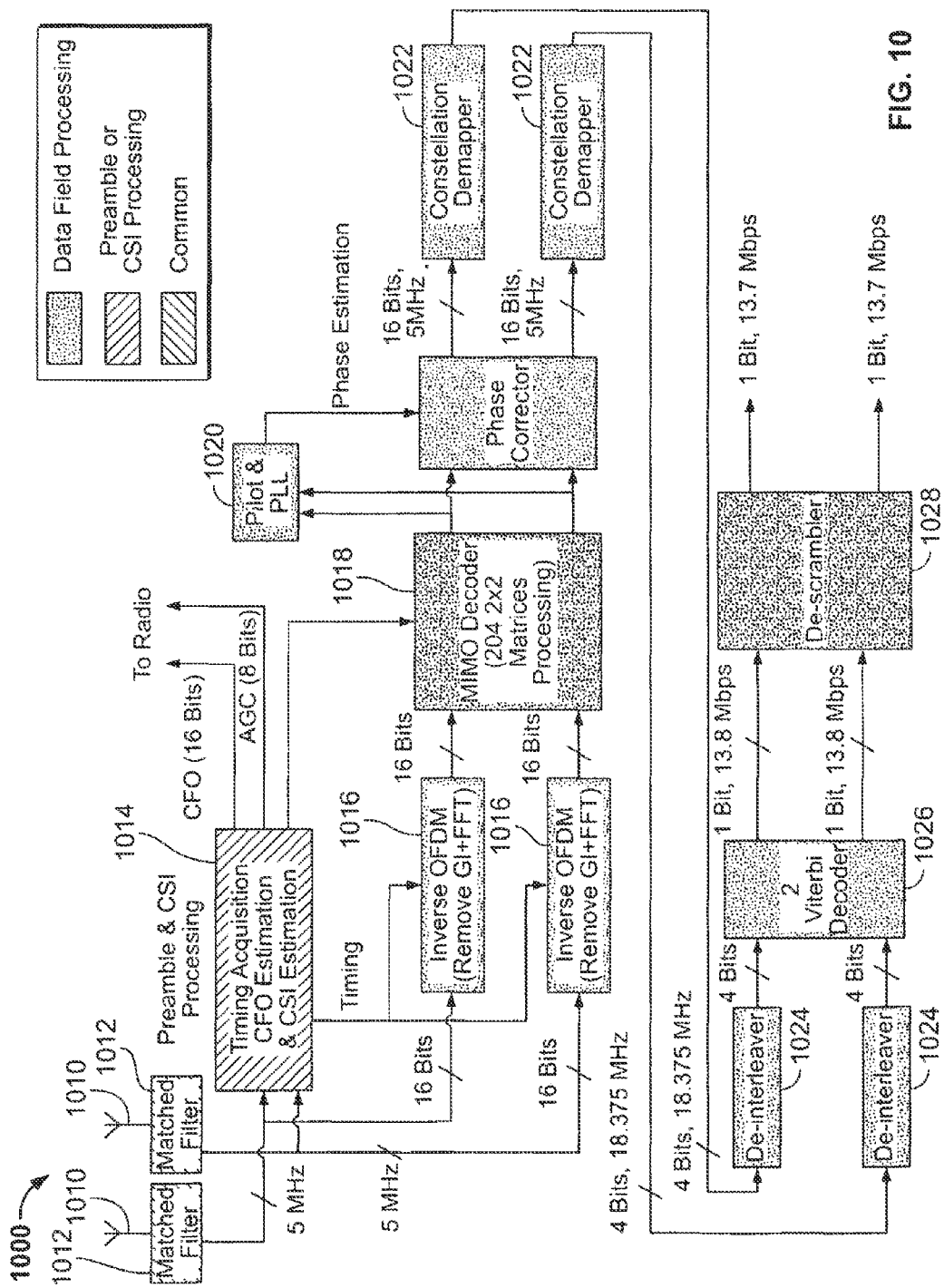
FIG. 10 is a block diagram of a MSA receiver in accordance with some aspects of the disclosure.

A node can receive a signal using a MSA receiver. The components of the MSA receiver can include one or more processors (e.g., microprocessors, DSPs, FPGAs, etc.) and memory. Their functions can be performed in hardware, in software executing on the processors, or combinations of hardware and software. FIG. 10 shows a MSA receiver 1000 with two receiving antennas 1010. MSA transmissions are received by the antennas 1010. The MSA transmissions received by the antennas 1010 are processed by two 12 bits digital to analog converters ("DAC") (not shown). The DACs are used for a pair of I and Q inputs at sampling rate of 10 Msamples/s. The DAC resolution is high enough to handle MSA signals, for example high enough to handle 1 sign bit, 2 bits head room for −12 dBFS, 4 bits to cover near far nodes (the far distance can be 16 times of the near distance), and 5 bits for the OFDM signal. There can be 2Nrx DACs or Nrx complex DAC outputs $x_j(lT_x)$ for a MSA receiver, where j=1,2, . . . Nrx is the receiver antenna index.

The Nrx RX complex signals from the DACs are filtered by matched filters 1012 corresponding to the antennas 1010. The matched filter 1012 can each be a 13-tap raised Cosine filter with α=0.1. Exemplary filter coefficients are listed in Table 6:

TABLE 6

MF coefficients (16 bits fixed point)

| n | h(n) |
|---|---|
| −6, 6 | −0.01656 |
| −5, 5 | 0.0225 |
| −4, 4 | 0.0283 |
| −3, 3 | −0.0768 |
| −2, 2 | −0.0375 |
| −1, 1 | 0.30767 |
| 0 | 0.541 |

The 10 MHz samples are immediately decimated to 5 MHz after the matched filters 1012. Each 5 MHz decimated matched filter output is $y_j(nT_s)$.

A preamble and CSI processing module (FIG. 10, 1014) can be used to implement automatic gain control. Automatic gain control is used because received signals can be received at very different input powers, while the baseband processing circuitry of the receiver expects signals in a more narrow amplitude range. The dynamic range can be from x dBm to y dBm. An initial AGC must be set before the second tone field received. The channel can be assumed to be static over the length of the slot and the gain of the radio is set at the beginning of the slot during the first received FTF. An automatic gain control set point can be determined from a peak to average measurement of a signal. The maximum peak to average ratio for a 64-QAM case is between 7-8 dB. The AGC set point can be −9 dBFS for 64-QAM OFDM.

A fast AGC algorithm can be used to more quickly determine an initial gain setting. The fast AGC algorithm measures a receive signal strength indicator ("RSSI"), R(n), on 4 samples of the frequency tone field:

$$R(n) = \frac{1}{4N_{rx}} \sum_{j=1}^{N_{rx}} \sum_{m=0}^{3} |y_j(m+n)|^2 \quad \text{[Equation 14]}$$

or $$R(n) = R(n-1) + \sum_{j=1}^{N_{rx}} |y_j(n+3)|^2 - |y_j(n-1)|^2 \quad \text{[Equation 15]}$$

Figure 11:
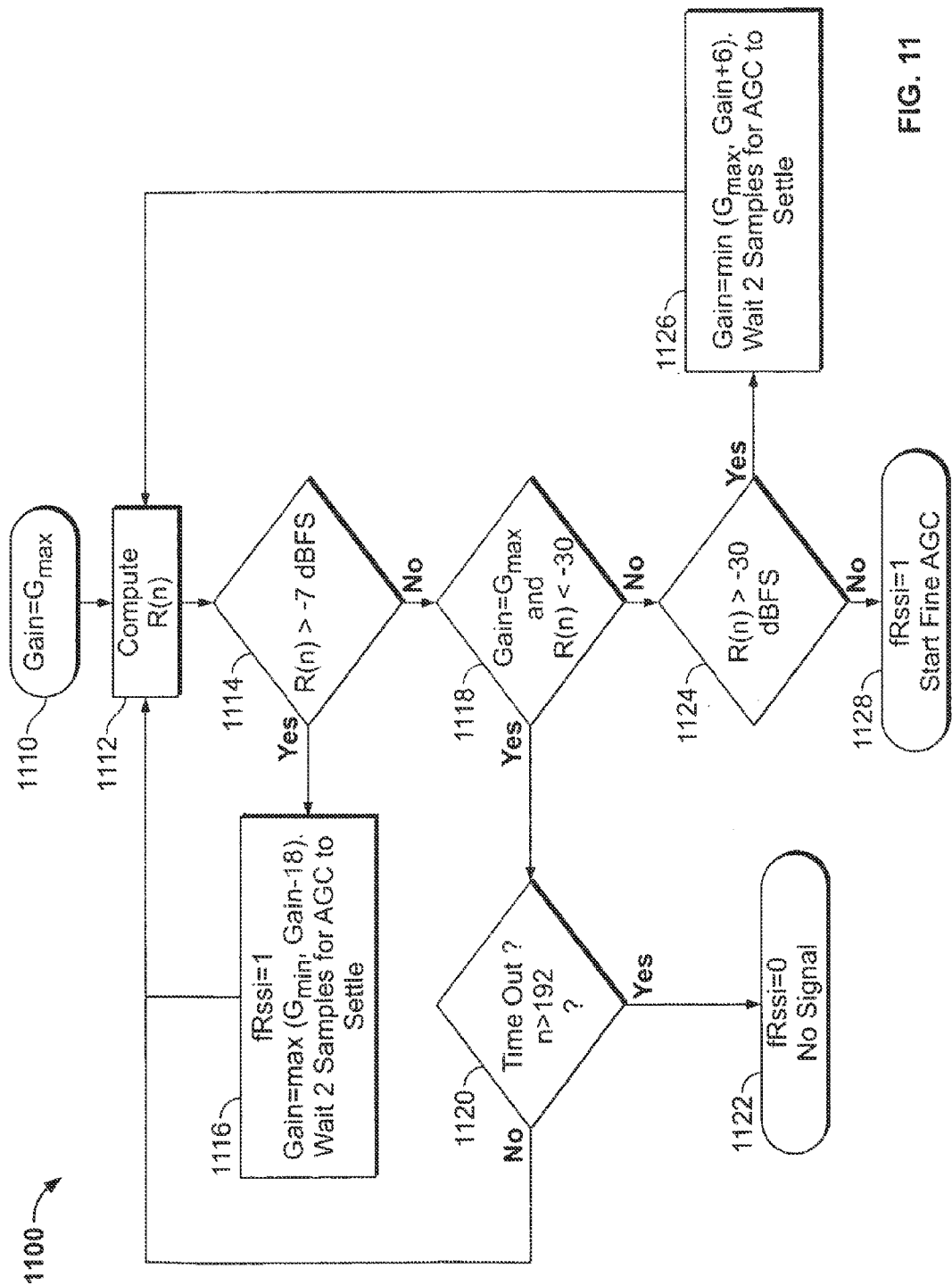
FIG. 11 is a flow chart of a fast AGC algorithm in accordance with some aspects of the disclosure.

FIG. 11 is a flow chart of the fast AGC algorithm 1100. The initial setting of the radio can be $G_{max}$ since it is desirable to detect weak signals (1110). The RSSI, R(n), is computed (1112) and compared to a −7 dBFS value (1114). If the measured RSSI of the data is greater than −7 dBFS the gain is decreased by 18 dB (1116). If not, the RSSI is compared to a −30 dBFS value and the gain is compared to $G_{max}$ (1118). If the signal level is greater than or equal to −30 dB and the gain is equal to the algorithm determines whether a maximum number of iterations has occurred (1120), for example 192 iterations. If so, a fRssi value is set to 0, indicating that no signal has been detected (1122). If the gain does not equal $G_{max}$ or if R(n) is less than −30 dB, then R(n) is compared to −30 (1124). If the signal level is less than −30 dB the gain is increased by 6 dB (1126) or set to $G_{max}$ if $G_{max}$ is less than the gain plus 6 dB. If R(n) is not less than −30 dB, the fRssi value is set to one, and a fine automatic gain control is initiated (1128). Each iteration requires about 6 samples (4 measurement+2 samples for settling time) for a total of 6N samples of N iterations.

After the fast AGC has converged on a value, the dynamic range of the data is in the range [−7 dBFS, −30 dBFS]. 16 samples are averaged to generate a reliable estimate of the RSSI:

$$RSSI = \frac{1}{16N_{rx}} \sum_{j=1}^{N_{rx}} \sum_{m=0}^{15} |y_j(m+n)|^2 \quad \text{[Equation 16]}$$

The gain value corresponding to −9 dBFS is:

$$G = -9 - 10 \log_{10}(RSSI) \quad \text{[Equation 17]}$$

This gain value can be sent to the radio to set the signal at −9 dBFS.

The preamble and CSI processing module (FIG. 10, 1014) can be used to detect which nodes are transmitting. When there is a transmission from at least one transmitting node in the slot, the current transmitting node index is detected using 64 point fast Fourier transform ("FFT") on $2^{nd}$ FTF:

$$Z_j(k) = FFT(z_j(n)), \quad \text{[Equation 18]}$$
$$k = 1, 2, \ldots 64$$

and $$P(k) = \sum_{j=1}^{N_{rx}} |Z_j(k)|^2, \quad \text{[Equation 19]}$$
$$k = 1, 2, \ldots 64$$

Figure 12:
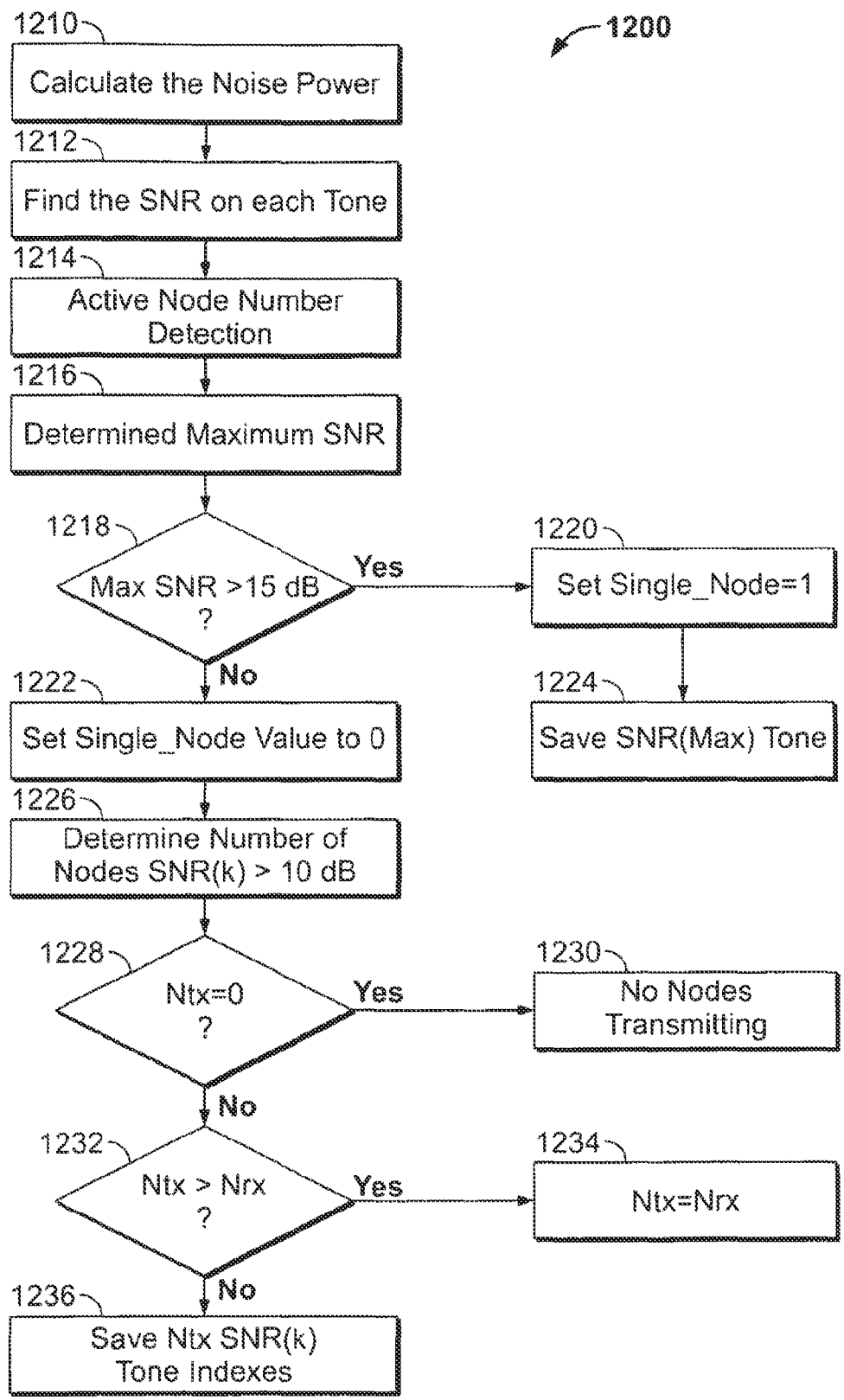
FIG. 12 is a flow chart of an algorithm to detect a node index in accordance with some aspects of the disclosure.

As shown in FIG. 12, the node index can be detected using an algorithm 1200. A noise power can be calculated (1210):

$$P_n = \sum_{k=2,4,\ldots 64} P(k) \quad \text{[Equation 20]}$$

An SNR can be determined for each tone (1212):

$$SNR(k) = \frac{P(k)}{P_n}, \quad \text{[Equation 21]}$$
$$k = 1, 3, 5, \ldots, 63$$

An active node number can be detected (1214):

$$SNR(k) = \frac{P(k)}{P_n}, \quad \text{[Equation 22]}$$
$$k = 1, 3, 5, \ldots, 63$$

A maximum SNR can be determined (1216):

$$SNR(max) = max(SNR(k)), k=1,3,5,\ldots,63 \quad \text{[Equation 23]}$$

The maximum SNR, then, is associated with one of the tones. The maximum SNR can be compared to a threshold value, for example 15 dB (1218). If the maximum SNR is greater than 15 dB, and the SNR for each of the other tones is less than 10 dB, i.e., SNR(k)<10 dB, a single node has been detected, and a Single_Node value can be set to 1 (1220). Otherwise, either no node or more than one node has been detected, and the Single_Node value can be set to 0 (1222). If the Single_Node value is 1, the SNR(max) tone can be saved and indexed as j1 (1224). If the Single_Node value is 0, a number of transmitting nodes Ntx whose SNR(k) is greater than 10 dB can be determined (1226). If Ntx=0 (1228), then no nodes are transmitting (1230). If Ntx>Nrx (1232), then Ntx can be set to Nrx (1234). The Nrx maximum SNR(k) can be used. The Ntx SNR(k) tone indexes can be saved as j1, j2, . . . jNtx (1236). The node index j1, j2, . . . jNtx can be used to pick the CSI fields.

Figure 13:
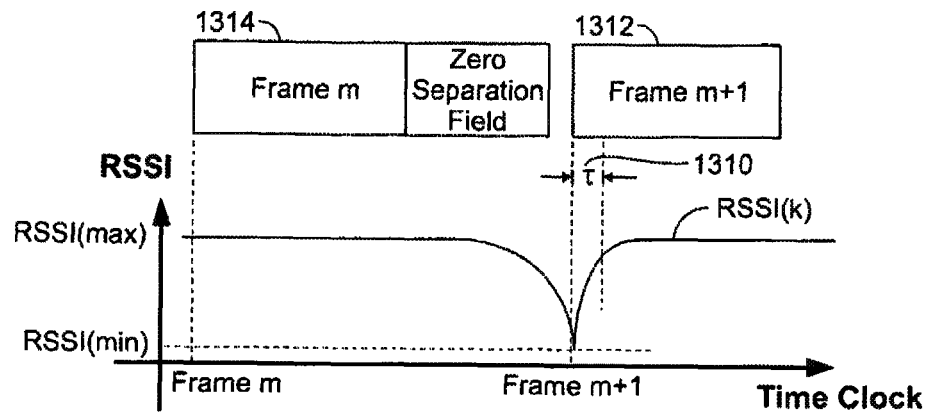
FIG. 13 is an illustration of a slot boundary in accordance with some aspects of the disclosure.

The preamble and CSI processing module (FIG. 10, 1014) can also detect signals and acquire timing. In a Slotted system, the Slot synchronization is achieved by a Low MAC protocol. The physical layer protocol works on a known slot boundary as shown in FIG. 13. FIG. 13 shows the detection of a start of a frame (slot). A new slot timing drift τ 1310 for a frame m+1 1312 compared to a frame m 1314 can be measured and sent to the Low MAC for the slot synchronization tracking. The slot timing drift τ is measured as the AGC is set at [−30-7] dBFS as shown in FIG. 11. The slot timing drift can be calculated as:

$$\tau = n_{signal} + 2 \quad \text{[Equation 24]}$$

$n_{signal}$ is the first time sample index for RSSI(n)>−30 as described for FIG. 11. The slot drift τ can be sent to the Low MAC protocol. The Low MAC protocol uses it for the slot time synchronization if there is only one node transmitting (i.e., Single_Node=1).

The preamble and CSI processing module 1014 can estimate a CFO. The received signal at the j-th antenna, $y_j(n)$ is:

$$y_j(n) = A_j s_j(n) e^{j2\pi\delta f n T s} + w_j(n) \quad \text{[Equation 25]}$$

$s_j$ (n) is the frequency tone field signal, δf is the carrier frequency offset and Ts is the sampling rate. The receiver noise, $w_j$ (n), is assumed to be zero-mean white Gaussian with variance $\sigma_n^2$ and the signal variance is assumed to be $\sigma_n^2$. Using the $2^{nd}$ and $3^{rd}$ frequency tone fields and the periodicity property of the frequency tone fields:

$$s_j(n+64) = s_j(n), n=0,1,\ldots 63 \quad \text{[Equation 26]}$$

$s_j(n)$ is the frequency tone field sequence. This property can be used to formulate the following statistic:

$$C_j(n_0) = \sum_{m=0}^{64-1} y_j(m + n_0 + 64) y_j^*(m + n_0), \quad \text{[Equation 27]}$$

$n_0$ = start of the $2^{nd}$ FTF

A maximum likelihood ("ML") estimate of the carrier frequency offset can be represented by:

$$\delta f = \frac{f_s}{2\pi \cdot 64} tg^{-1} \left\{ \frac{imag\left[\sum_{j=1}^{N_{rx}} C_j(n_0)\right]}{real\left[\sum_{j=1}^{N_{rx}} C_j(n_0)\right]} \right\} \quad \text{[Equation 28]}$$

$f_s$=5 MHz.

δf can be filtered by a one-pole infinite impulse response ("IIR") filter if there is only one node transmitting (i.e., Single_Node=1):

$$CFO = 0.9 \cdot CFO + 0.1 \cdot \delta f \quad \text{[Equation 29]}$$

The carrier frequency offset is sent to the Low MAC for the frequency synchronization.

Figure 14:
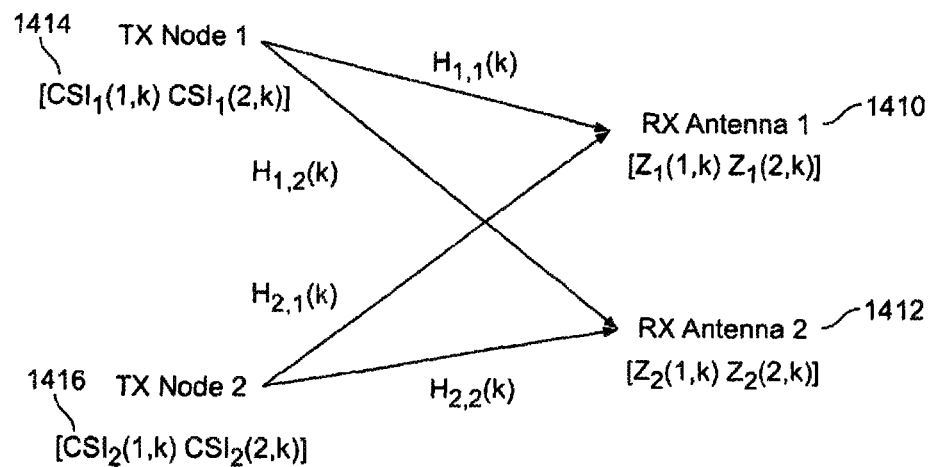
FIG. 14 is an illustration of a computation of H(k) values in accordance with some aspects of the disclosure.

The preamble and CSI processing module (FIG. 10, 1014) can also estimate CSI values. FIG. 14 illustrates the computation of H(k) values for two CSI fields. Each slot consists of Nrx 320-sample CSI fields in a MSA system. 64 GI samples are removed from the CSI fields at Inverse OFDM modules (FIG. 10, 1016). The CSI fields in the frequency domain can be recovered by taking a 256-point fast Fourier transforms of the symbol. By way of example, a MSA-2 with Nrx=2 is described. A CSI frequency domain vector at two receiver antenna output can be defined as:

$$\overline{Z}(1,k) = [Z_1(1,k) Z_2(1,k)] \text{ for } 1^{st} \text{ CSI} \quad \text{[Equation 30]}$$

$Z_1$ and $Z_2$ 1410, 1412 are two antenna outputs;

$$\overline{Z}(2,k) = [Z_1(2,k) Z_2(2,k)] \text{ for } 2^{nd} \text{ CSI} \quad \text{[Equation 31]}$$

$Z_1$ and $Z_2$ are two antenna outputs.

For each sub-carrier k, the CSI is a 2×2 matrix denoted by H(k):

$$H(k) = \begin{bmatrix} H_{1,1}(k) & H_{1,2}(k) \\ H_{2,1}(k) & H_{2,2}(k) \end{bmatrix} \quad \text{[Equation 32]}$$

The two antenna outputs 1410, 1412 for the two CSI fields 1414, 1416 are:

$$\begin{bmatrix} Z_1(1,k) & Z_2(1,k) \\ Z_1(2,k) & Z_2(2,k) \end{bmatrix} = \quad \text{[Equation 33]}$$

-continued $$\begin{bmatrix} CSI_1(1,k) & CSI_2(1,k) \\ CSI_1(2,k) & CSI_2(2,k) \end{bmatrix} \begin{bmatrix} H_{1,1}(k) & H_{1,2}(k) \\ H_{2,1}(k) & H_{2,2}(k) \end{bmatrix}$$

The k-th CSI matrix estimation is:

$$\begin{bmatrix} H_{1,1}(k) & H_{1,2}(k) \\ H_{2,1}(k) & H_{2,2}(k) \end{bmatrix} = \quad\quad \text{[Equation 34]}$$

$$\begin{bmatrix} Z_1(1,k) & Z_2(1,k) \\ Z_1(2,k) & Z_2(2,k) \end{bmatrix} \begin{bmatrix} CSI_1(1,k) & CSI_2(1,k) \\ CSI_1(2,k) & CSI_2(2,k) \end{bmatrix}^{-1}$$

After the carrier frequency offset is estimated and the channel state information is estimated, the data field of the received MSA slot can be processed. Referring back to FIG. 2, frequency tone fields 210, 212, 24 and CSI fields 216, 218 are followed by a data field 220, which includes 8 OFDM symbols. Each 64 μsec long OFDM symbol has 320 samples. Referring back to FIG. 10, based on Nrx matched filter output streams, the 64-symbol GI is removed first from each stream at the inverse OFDM blocks 1016. Then Nrx 256-point complex fast Fourier transforms are taken on each of the 256 complex time samples at the inverse OFDM blocks 116:

$$Z_j = fft(z_j(n)), j=1,2,\ldots Nrx \quad\quad \text{[Equation 35]}$$

When there are $N_{tx} \leq N_{rx}$ TX nodes, a received vector is $$\vec{Z}(k) = \vec{X}(k)H(k) + \vec{W}(k) \quad\quad \text{[Equation 36]}$$

where $$\vec{Z}(k) = [Z_1(k), Z_2(k) \ldots, Z_{N_{rx}}(k)] \quad\quad \text{[Equation 37]}$$

$$H(k) = \begin{bmatrix} H_{1,1}(k) & H_{1,2}(k) & H_{1,N_{tx}}(k) \\ H_{2,1}(k) & H_{2,1}(k) & H_{2,N_{tx}}(k) \\ & \vdots & \\ H_{N_{tx},1}(k) & H_{N_{tx},2}(k) & H_{N_{tx},N_{tx}}(k) \end{bmatrix}_{N_{tx} \times N_{rx}} \quad \text{[Equation 38]}$$

and the signal symbol vector is $$\overline{X}(k) = [X_1(k), X_2(k), \ldots, X_{N_u}(k)] \quad\quad \text{[Equation 39]}$$

With further reference to FIG. 10, a MIMO minimum mean squared error ("MMSE") decoder 1018 can identify and recover several distinct signals transmitted on the same channel from several transmitters. The MMSE decoder 1018 uses the channel state information matrix in the decoding. For example, the signal $$\overline{X}(k) = [X_1(k), X_2(k), \ldots, X_{N_u}(k)] \quad\quad \text{[Equation 40]}$$

can be recovered from received vector $$\overline{Z}(k) = [Z_1(k), Z_2(k) \ldots, Z_{N_u}(k)] \quad\quad \text{[Equation 41]}$$

When Ntx=Nrx, there is only one frequency domain stream $$\hat{X}_1(k) = \frac{1}{N_{rx}} \sum_{j=1}^{N_{rx}} H_{1,j}^* \cdot Z_j(k), \quad\quad \text{[Equation 42]}$$

$k \in$ Data tones and pilot tones

When Ntx=Nrx, a Nrx dimensional vector is decoded as:

$$[\hat{X}_1(k), \hat{X}_2(k), \ldots, \hat{X}_{N_{tx}}(k)] = \quad\quad \text{[Equation 43]}$$

$$[Z_1(k), Z_2(k) \ldots, Z_{N_{rx}}(k)]G_{N_{rx},N_{rx}}(k)$$

where $$G_{N_{rx},N_{rx}}(k) = (H(k))^{-1}, k \in \text{Data tones and pilot tones} \quad \text{[Equation 44]}$$

When $1 < N_{tx} < N_{rx}$, [Equation 45]

$$[\hat{X}_1(k), \hat{X}_2(k), \ldots, \hat{X}_{N_{tx}}(k)] = \begin{bmatrix} Z_1(k) \\ Z_2(k) \\ \vdots \\ Z_{N_{rx}}(k) \end{bmatrix} G_{N_{tx},N_{rx}}(k)$$

where $G(k) = H^*(k)(H(k)H^*(k))^{-1}$, $k \in$ Data tones and pilot tones [Equation 46]

Nrx MIMO data streams can be recovered by the above MIMO MMSE decoding. If the CSI H(k) is not invertible, the values generated by the MIMO decoder 1018 will include a large amount of error. Preferably, the MSA system is a distributed MIMO system and the CSI H(k) includes two independent RF transmitter chains, so the possibility of a singular H(k) is small.

The MIMO decoder 1018 recovers the Ntx streams as:

$$\vec{\hat{X}}(k) = \begin{bmatrix} \hat{X}_1(k) \\ \hat{X}_2(k) \\ \vdots \\ \hat{X}_{N_{tx}}(k) \end{bmatrix} \quad\quad \text{[Equation 47]}$$

Phase error can be estimated and corrected by a phase lock loop ("PLL") 1020 based on the pilot tones. For the m-th OFDM symbol, the phase error is estimated by:

$$\hat{\phi}_m = \arg\left\{\frac{\sum_j \sum_k \text{Im}(\hat{X}_j(k))}{\sum_j \sum_k \text{Re}(\hat{X}_j(k))}\right\} \quad k \in \text{pilot tones}, \quad \text{[Equation 48]}$$

$$j = 1, 2, \ldots Nrx$$

The data tones at m-th OFDM symbol are phase corrected by (m−1)-th PLL 1020 output:

$\hat{X}_j(k) = \hat{X}_j(k) \cdot \exp(-j\hat{\phi}_{m-1})$, $k \in$ Data Tones [Equation 49]

Constellation demappers 1022 perform constellation demapping on the decoded bit streams. For a 64-QAM case, each data tone $\hat{X}_j(k)$ consists of 6 soft bits at j-th stream and k-th subcarrier:

$b_j(k,0), b_j(k,1), b_j(k,2), b_j(k,3), b_j(k,4), b_j(k,5), j=1,2,\ldots$ Ntx [Equation 50]

The soft bits can be calculated according to the following equations:

$$b_j(k, 0) = \text{Re}[\hat{X}_j(k)] \quad\quad \text{[Equation 51]}$$

$$b_j(k, 1) = \frac{4}{\sqrt{42}} - |b_j(k, 0)| \quad\quad \text{[Equation 52]}$$

$$b_j(k, 2) = \frac{2}{\sqrt{42}} - |b_j(k, 1)|$$ [Equation 53]

$$b_j(k, 3) = \text{Im}[\hat{X}_j(k)]$$ [Equation 54]

$$b_j(k, 4) = \frac{4}{\sqrt{42}} - |b_j(k, 3)|$$ [Equation 55]

$$b_j(k, 5) = \frac{2}{\sqrt{42}} - |b_j(k, 4)|$$ [Equation 56]

When Ntx>1, soft bits are further weighted by:

$$[b_j(k, 0), b_j(k, 1), b_j(k, 2), b_j(k, 3), b_j(k, 4), b_j(k, 5)] =$$ [Equation 57]

$$\frac{[b_j(k, 0), b_j(k, 1), b_j(k, 2), b_j(k, 3), b_j(k, 4), b_j(k, 5)]}{\sqrt{\sum_{m=1}^{N_{rx}} |G_{m,j}(k)|^2}}$$

$G_{m,j}(k)$ is the MIMO decoder gain calculated by the MIMO decoder 1018.

The MIMO decoder 1018 can also perform MIMO decoding involving the inverse of the matrix H(k):

$$[\hat{X}_1(k), \hat{X}_2(k), \ldots, \hat{X}_{N_{tx}}(k)] = [Z_1(k), Z_2(k) \ldots, Z_{N_{tx}}(k)]$$
$$\cdot G_{N_{tx},N_{tx}}(k)$$ [Equation 58]

where $$G_{N_{rx},N_{rx}}(k) = \det^*(k)(H(k))^{-1} = \det^*(k)\frac{A(k)}{\det(k)},$$ [Equation 59]

Since performing the division can require significant resources, the following values can be used:

$$[U_1(k), U_2(k), \ldots, U_{N_u}(k)] = [Z_1(k), Z_2(k) \ldots, Z_{N_{tx}}(k)]$$
$$\cdot \det^*(k)A(k) = |\det(k)|^2 [\hat{X}_1(k), \hat{X}_2(k), \ldots, \hat{X}_{N_{tx}}(k)]$$ [Equation 60]

The soft bits can be calculated according to the following equations:

$$b_j(k, 0) = \text{Re}[U_j(k)]$$ [Equation 61]

$$b_j(k, 1) = \frac{4|\det(k)|^2}{\sqrt{42}} - |b_j(k, 0)|$$ [Equation 62]

$$b_j(k, 2) = \frac{2|\det(k)|^2}{\sqrt{42}} - |b_j(k, 1)|$$ [Equation 63]

$$b_j(k, 3) = \text{Im}[U_j(k)]$$ [Equation 64]

$$b_j(k, 4) = \frac{4|\det(k)|^2}{\sqrt{42}} - |b_j(k, 3)|$$ [Equation 65]

$$b_j(k, 5) = \frac{2|\det(k)|^2}{\sqrt{42}} - |b_j(k, 4)|$$ [Equation 66]

When Ntx is greater than 1, the soft bits can be further weighted by:

$$[b_j(k, 0), b_j(k, 1), b_j(k, 2), b_j(k, 3), b_j(k, 4), b_j(k, 5)] =$$ [Equation 67]

$$\frac{[b_j(k, 0), b_j(k, 1), b_j(k, 2), b_j(k, 3), b_j(k, 4), b_j(k, 5)]}{\sqrt{\sum_{m=1}^{N_{rx}} |\det^*(k)A_{m,j}(k)|^2}}$$

This allows the MIMO decoder 1018 to perform calculations without the 1/det(k) operation.

The soft bit streams $\{b_j(k, 0), b_j(k,1), b_j(k,2), b_j(k,3), b_j(k,4), b_j(k,5)\}$ can be de-interleaved by Ntx De-interleavers 1024. The deinterleavers 1024, which perform the inverse of the function performed by the interleaver (FIG. 7, 714), can be defined by two permutations. The first permutation can be defined by the rule:

$$i=3\cdot\text{floor}(j/3)+\text{mod } [j+\text{floor}(14\cdot i/1176),3], i=0,1, \ldots 1175$$ [Equation 68]

The 2nd permutation can be defined by the rule:

$$k=14i-1175\cdot\text{floor}(14\cdot i/1176), n=0,1, \ldots 1175$$ [Equation 69].

The frequency deinterleaving can also be implemented by a LUT method.

Ntx Viterbi decoders 1026 with trace back length of 64 can be used to decode the bit streams from the de-interleavers 1024. A de-scrambler 1028 can be used to descramble the OFDM symbols scrambled using the scrambler (FIG. 7, 710).

Figure 15:
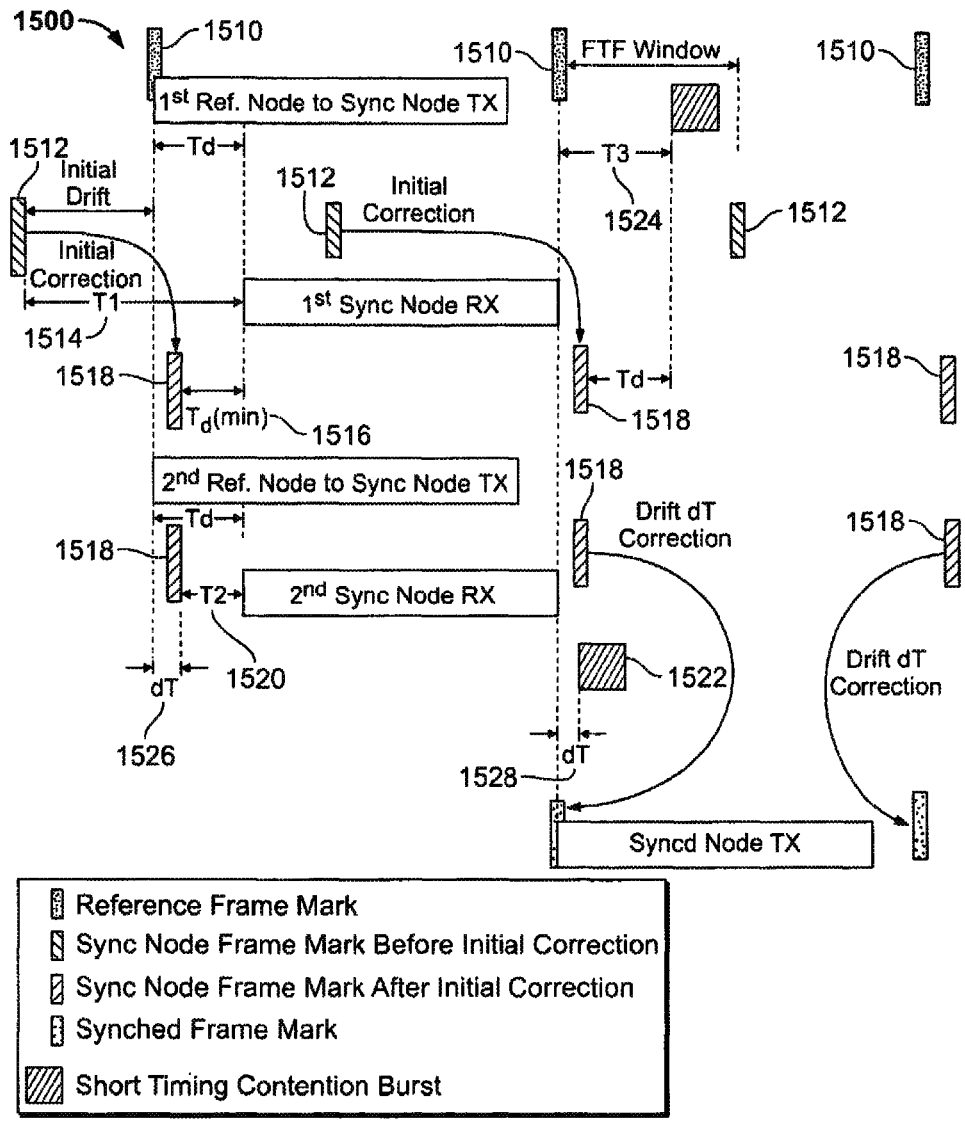
FIG. 15 is an illustration of an algorithm to synchronize to a reference node in accordance with some aspects of the disclosure.

A distributed MIMO system consists of a group of nodes at different locations and with different clock drifts. MSA time synchronization can be used to ensure that all of the nodes transmit at the same time such that transmissions from the distributed nodes can be treated as transmissions from one node passing through a multipath channel. FIG. 15 illustrates an algorithm 1500 for a node (referred to here as a synchronizing node or synch node) that has just joined the neighborhood of nodes to time synchronize to a reference node.

The reference node is a node that is already operating on a correct slot mark 1510. The synch node is operating on an arbitrary slot mark 1512. The synch node receives a reference slot at the measured time T1 1514. The synch node slot mark is advanced to $T_d(\min)$ 1516 from the received point, where $T_d(\min)$ is the MSA minimum distance time (0.03 μsec). The synch node now is operating on a new slot mark 1518. The synch node listens to the reference node for a second transmission. A measurement time associated with the second transmission is T2 1520 and $$T2=Td-dT$$ [Equation 70]

After receiving the second slot, the synch node transmits a short timing contention slot 1522 to the reference node. A short timing contention slot is a 128-sample complex tone field, such as two frequency tone fields. The short timing contention frequency tone is randomly selected from a list of unused tones. The short timing contention slot is used by the reference node to set the automatic gain control, measure the short timing contention tone and measure its arrival time, T3 1524:

$$T3=Td+dT$$ [Equation 71]

The short timing contention slot can only be detected and measured when there is only a short timing contention transmission in that slot.

The reference node sends back the measurement T3 1524 to the synch node. Each MSA node measures as T3(n) value from all of the other nodes and only stores the latest T3(n) in the memory, where n=1, 2, . . . N_node. Every 1 second a Node will broadcast N_node T3(n). T3(n) is a 9-bit unsigned integer that represents a maximum possible T3(n) of 51.2 µsec with 0.1 µsec resolution. Therefore a total T3 message consists of 9*N_node T3 bits and N_node·log$_2$ (N_node) node index bits. Slot timing adjustment should not be allowed before sending the T3 message.

A synch node time drift dT 1526 can be computed from Equations 70 and 71:

$$dT=(T3-T2)/2 \qquad \text{[Equation 72]}$$

The synch node adjusts its slot again by dT 1528. The synch node is synched to the reference node. In the MSA, all nodes are constantly tracking the time drift, dT. After a node is synchronized, a MSA slot can be transmitted rather than a short timing contention slot. If a node includes a 0.1 ppm oscillator and the network has a timing error requirement of 0.1 µsec, each node needs to receive a T3 measurement every 1 second.

Figure 16:
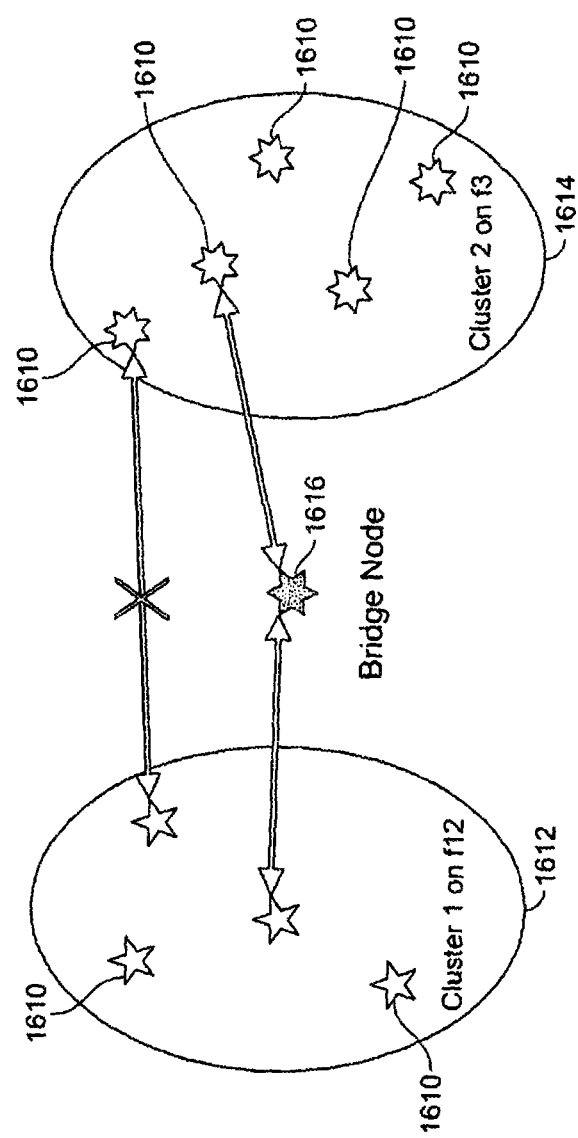
FIG. 16 is a block diagram of a MSA system in accordance with some aspects of the disclosure.

The synch node can determine the network frequency by measuring the carrier frequency offset a number of times (e.g., at least 20 times) adjusting its oscillator to match the network frequency before transmitting. As shown in FIG. 16, the MSA nodes 1610 can be frequency synchronized in an isolated mesh network where two clusters 1612, 1614 are not in a communication range. The frequency synchronization algorithm can be configured to use a "lowest" frequency identification ("ID") value and propagate that information to neighboring nodes to get convergence on a frequency associated with the frequency ID value. For example, the first cluster 1612 chooses a frequency ID of 12 and the second cluster 1614 chooses a frequency ID of 3. A bridge node 1616 listens to nodes from both clusters 1612, 1614. The bridge node 161 chooses the frequency of the second cluster 1614 because the frequency ID is 3 which is lower than the frequency ID of 12 of the first cluster 1612. The bridge node 161 adjusts its transmit/receive frequency to the frequency associated with the frequency ID of 3. When the nodes in the first cluster 1612 receive a signal from the bridge node 1616, they will change their frequency to the frequency associated with the frequency associated with the frequency ID value of 3.

MSA network synchronization is a combined effort of time and frequency synchronization. There are two MSA synchronization modes: a newly joined synch node synchronizing to the network and a synched node tracking the timing of the network to remain synchronized.

Figure 17:
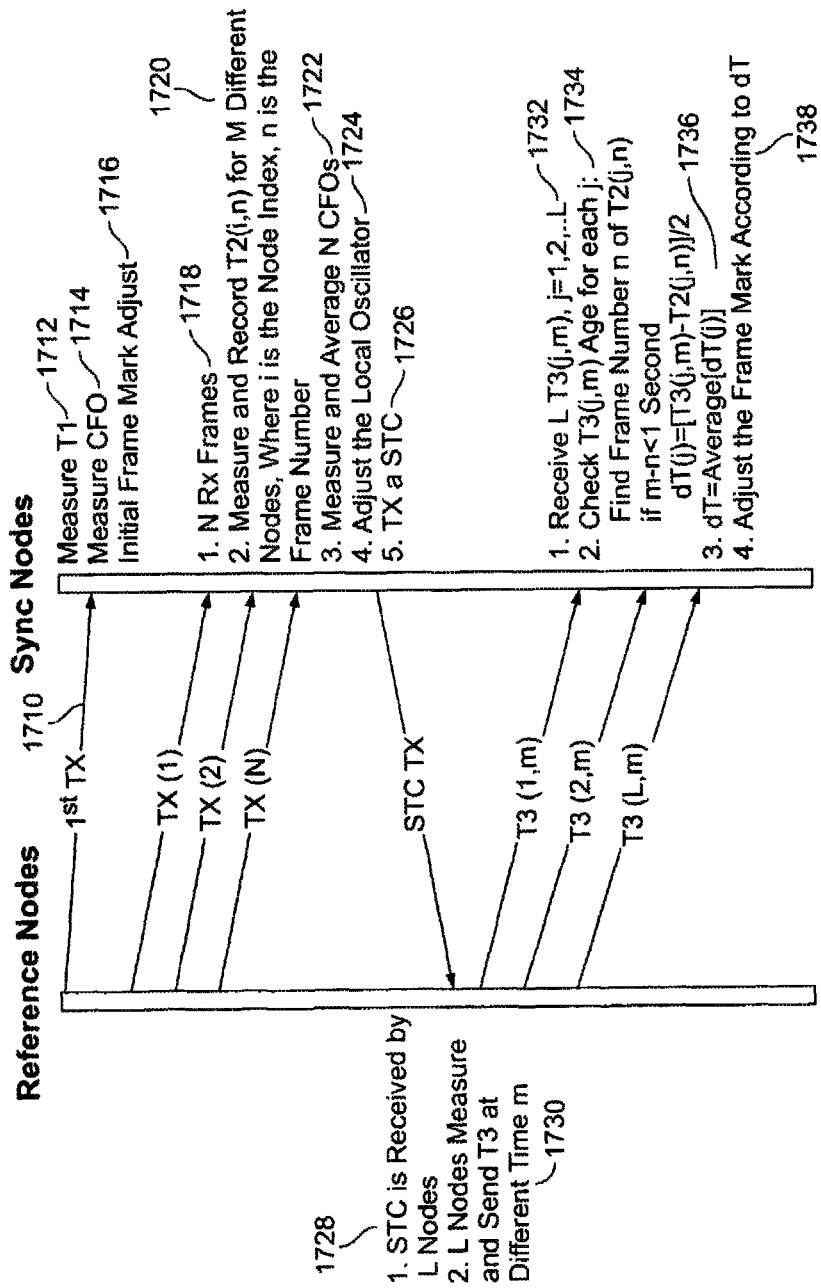
FIG. 17 is a ladder diagram of a newly joined synch node synchronizing to a network in accordance with some aspects of the disclosure.

FIG. 17 shows a ladder diagram of a newly joined synch node synchronizing to a network. The new joined node is timing and frequency un-synched. The synch node receives a transmission from one of a set of reference nodes (the other nodes in the neighborhood) 1710. The synch node measures the time T1 that it received the transmission 1712. The synch node estimates a carrier frequency offset for the frame for frequency synchronization 1714 and performs an initial frame mark adjustment 1716. The synch node then receives a set of transmissions TX(1)-Tx(N) from the reference nodes 1718 and measures and records the received timing T2(i,n) for M different nodes, where i is the node index and n is the frame number 1720. The synch node measures carrier frequency offsets for each of the received transmissions and calculates an average CFO 1722. The synch node then adjusts its local oscillator 1724. The synch node transmits a short timing contention slot to each of the reference nodes 1726. The short timing contention slot is received by the reference nodes 1728. Each reference node measures the timing T3 of its receipt of the short timing contention slot at a different time m and transmits the timing T3(j,m) to the synch node 1730. The synch node receives the set of T3(j,m), where j=1, 2, . . . , L 1732. The Synch node checks the age of each T3(j,m) for each j and finds a frame number n of T2(j,n) 1734. If m−n<1 second, then the time drift dT with respect to each reference node is $$dT(j)=[T3(j,m)-T2(j,n)]/2 \qquad \text{[Equation 73]}$$

The synch node calculates an average time drift dT as the average of dT(j) 1736. The synch node adjusts the frame mark according to dT 1738.

Figure 18:
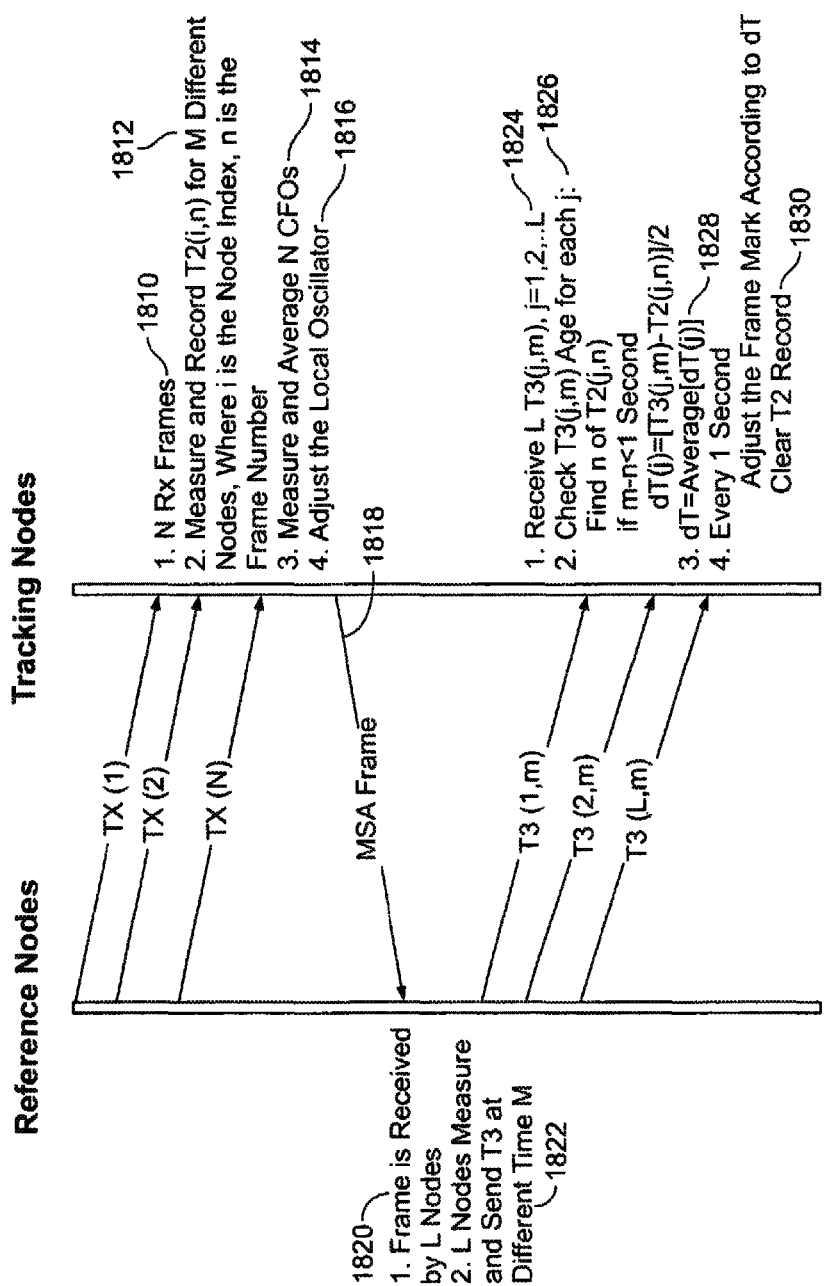
FIG. 18 is a ladder diagram for a node in a tracking mode in accordance with some aspects of the disclosure.

FIG. 18 shows a ladder diagram for a node in a tracking mode, where a synched node is tracking the timing of the network to remain synchronized. After the node has synched with the network, the timing and frequency are constantly changing due to frequency oscillator drift and movement of the node and other nodes. Therefore the timing and frequency are tracked continuously. A tracking node (node that is tracking the network timing to remain synchronized) receives a set of frames TX(1) through TX(N) transmitted from a set of reference nodes (other nodes in the neighborhood) 1810. The tracking node measures and records a received time T2(i,n) for M different nodes, where i is the node index and n is the frame number 1812. The tracking node measures carrier frequency offsets for each of the frames and calculates an average CFO for the N frames 1814 and adjusts its local oscillator based on the average CFO 1816. The Tracking node transmits a MSA frame to each of the reference nodes 1818. The MSA frame is received by L reference nodes 1820. Each reference node measures a received time t# for the MSA frame at a different time m and transmits to the Tracking node the T3(j,m) 1822. The tracking node receives the L T3(j,m) transmissions, where j=1, 2, . . . L 1824. The Synch node checks the age of T3(j,m) for each j and finds a frame number n of T2(j,n) 1826. If m−n<1 second, then the time drift dT with respect to each reference node is $$dT(j)=[T3(j,m)-T2(j,n)]/2 \qquad \text{[Equation 74]}$$

The Synch node calculates an average time drift dT as the average of dT(j) 1828. The tracking node periodically (e.g., every 1 second) adjusts the frame mark according to dT, and clears the record for T2 1830.

A MSA node transmit rate p can be set according to:

$$p = \frac{N_s}{N_{node}} \qquad \text{[Equation 75]}$$

$N_s$ is a number of system available streams $N_{node}$ is a number of active nodes. $N_s$ is a dynamic parameter depending on the slot usage tone (FIG. 4, 416). A node can operate on a high quality of service ("QoS") mode when its first tone in a tone group is set. The node can reserve the next slot to transmit. For all other nodes' transmission, the $N_s$ is set to $$N_s=N_{rx}-1 \qquad \text{[Equation 76]}$$

When m (m≤$N_{rx}$) nodes are working on the high QoS mode, the $N_s$ value is set to $$N_s=N_{rx}-m \qquad \text{[Equation 77]}$$

where 0≤$N_s$≤$N_{rx}$. $N_{node}$ can be estimated over an observation window of 64 slots. The number of active tones can be detected on the FTFs.

The CSMA/CA and MSA protocols have been simulated and compared. Both CSMA/CA and MSA were simulated using the same physical layer specifications:
- 20 MHz bandwidth
- 64 FFT OFDM
- 0.8 usec Guard interval
- Data rate 54 Mbps (coding rate=¾, 64 QAM)
- 13 OFDM symbols per packet The CSMA/CA MAC layer was simulated based on the following parameters:
- Slot time: 9 usec
- DIFS: 5 slots
- No RTS and CTS, (no hidden node protection)
- Each node had a length of 200 slots first-in-first-out ("FIFO")
- An acknowledgment ("ACK") was immediately available to each TX node;
- All nodes had the same arrive rate $\lambda$ and the system had an arrive rate of 16·$\lambda$ for 16 node simulations.

The MSA MAC layer was simulated using the following parameters:
1. Each node monitored the active nodes;
2. An adaptive rate control algorithm had the parameters:
   Over Ns=16 slots monitoring window, each node counted the number of active nodes in the system: N_node;
   A node transmission rate p=Nss/N_node was used, where the RX antenna number Nss=2, 4, 6;
3. All nodes had the same arrive rate $\lambda$ and the system arrive rate was 16·$\lambda$ for 16 node simulations;
4. An ACK was immediately available to each TX node;
5. Each node had a length of 200 slots FIFO;
6. Transmission delay was defined as T_out−T_in, where T_in was the time a packet entered the FIFO and T_out was the time a packet was successfully transmitted from the FIFO.

Figure 19:
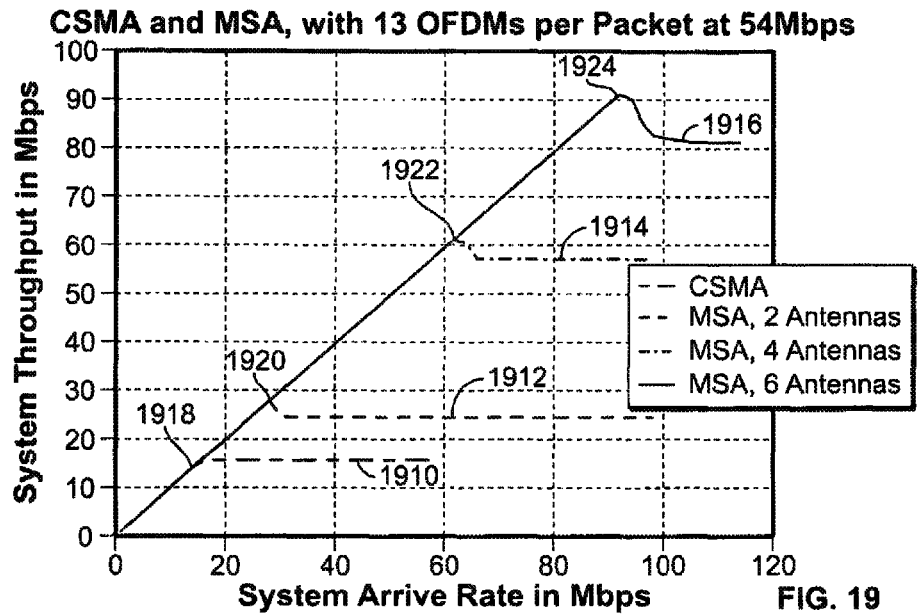
FIG. 19 is a graph of system throughput as a function of system arrival rate in accordance with some aspects of the disclosure.
Figure 20:
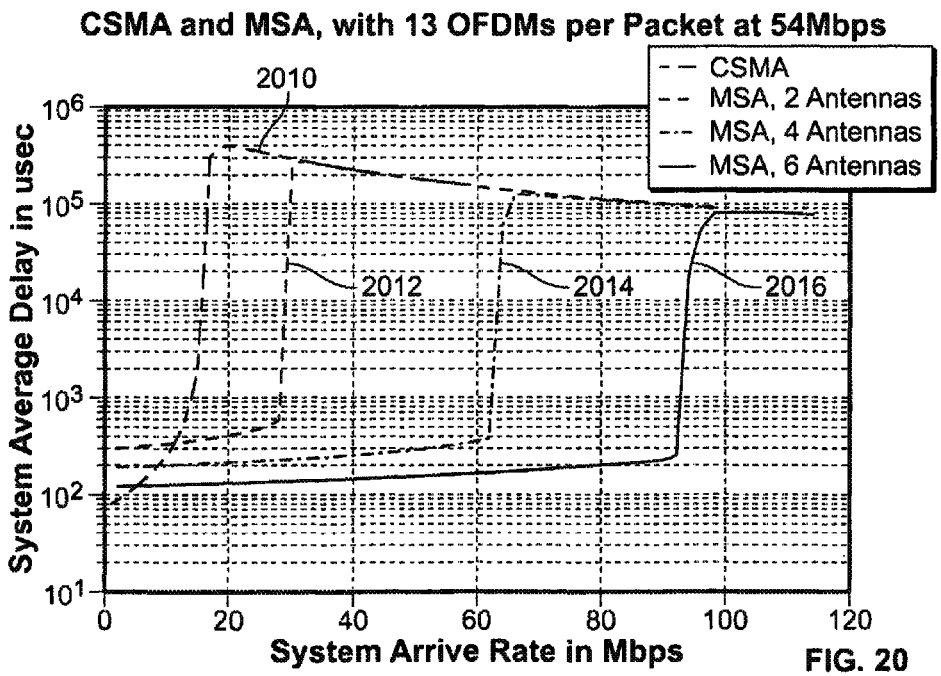
FIG. 20 is a graph of average delay as a function of system arrival rate in accordance with some aspects of the disclosure.

FIG. 19 shows system throughput for a CSMA/CA system 1910, a two antenna MSA system 1912, a four antenna MSA system 1914, and a six antenna MSA system 1916 as a function of the system arrival rate. FIG. 20 shows average delay for the CSMA/CA system 2010, the two antenna MSA system 2012, the four antenna MSA system 2014, and the six antenna MSA system 2016 as a function of the system arrival rate. MSA and CSMA/CA were compared at their throughput tuning points 1918, 1920, 1922, 1924 shown in FIG. 19. Table 7 lists the system throughput and delay at the turning points. The MSA throughput improvement is about Nss times compared with the CSMA.

TABLE 7

CSMA/CA and MSA throughput and delay at the turning point

|  | System arrive rate in Mbps | System throughput in Mbps | System average delay in usec |
|---|---|---|---|
| CSMA | 15 | 14.7 | 2124 |
| MSA 2 | 28 | 27.8 | 569 |
| MSA 4 | 62 | 61.2 | 384 |
| MSA 6 | 92 | 91.3 | 246 |

Figure 21:
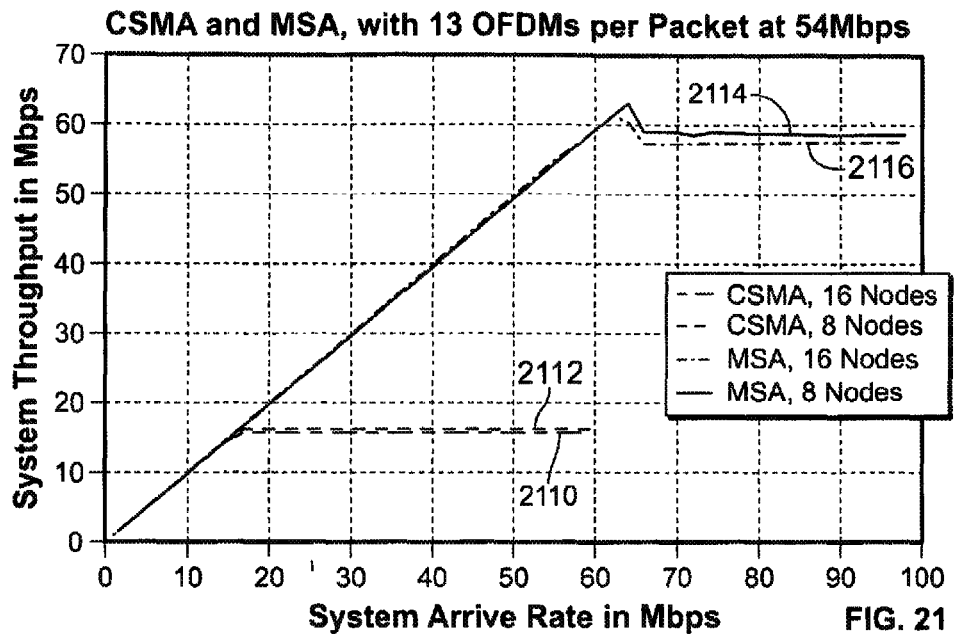
FIG. 21 is a graph of system throughput as a function of system arrival rate in accordance with some aspects of the disclosure.

FIG. 21 shows a comparison of throughputs for eight node 2110 and 16 node 2112 CSMA/CA and four antenna MSA ("MSA-4") with eight nodes 2114 and 16 nodes 2116. The throughput at the turning points were unchanged with the number of nodes for both CSMA/CA and MSA4. In MSA, the active node number was known to each node so that each node could quickly adjust its transmission rate to achieve highest throughput.

Figure 22:
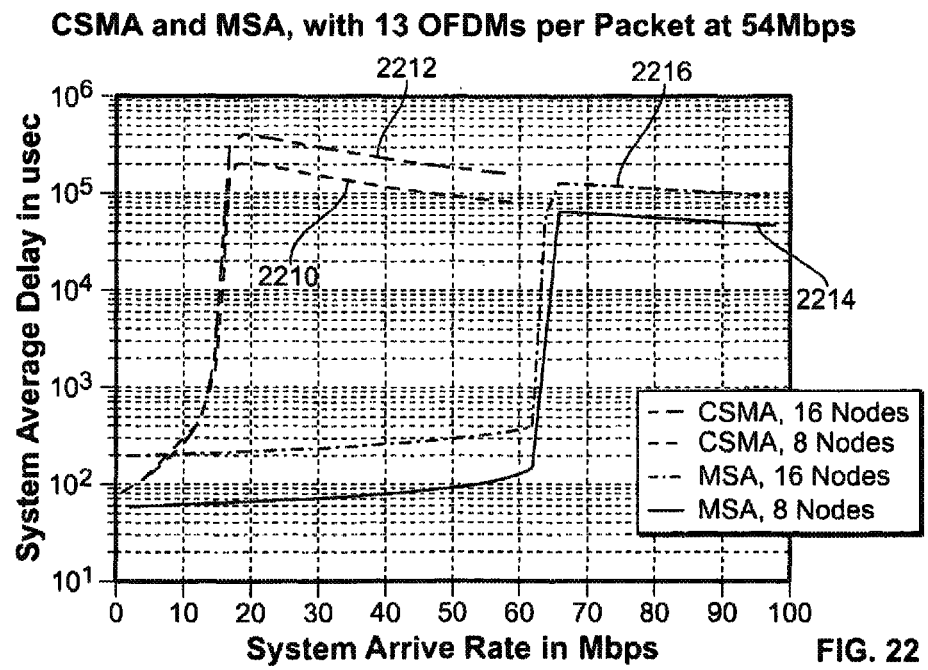
FIG. 22 is a graph of average delay as a function of system arrival rate in accordance with some aspects of the disclosure.

FIG. 22 shows delay performance for eight node 2210 and 16 node 2212 CSMA/CA and MSA4 with eight nodes 2214 and 16 nodes 2216. When node number changed from 16 to 8, the CSMA/CA delay went from 2124 μsec down to 1598 μsec. The MSA-4 delay, however, went from 384 μsec down to 142 μsec.

Figure 23:
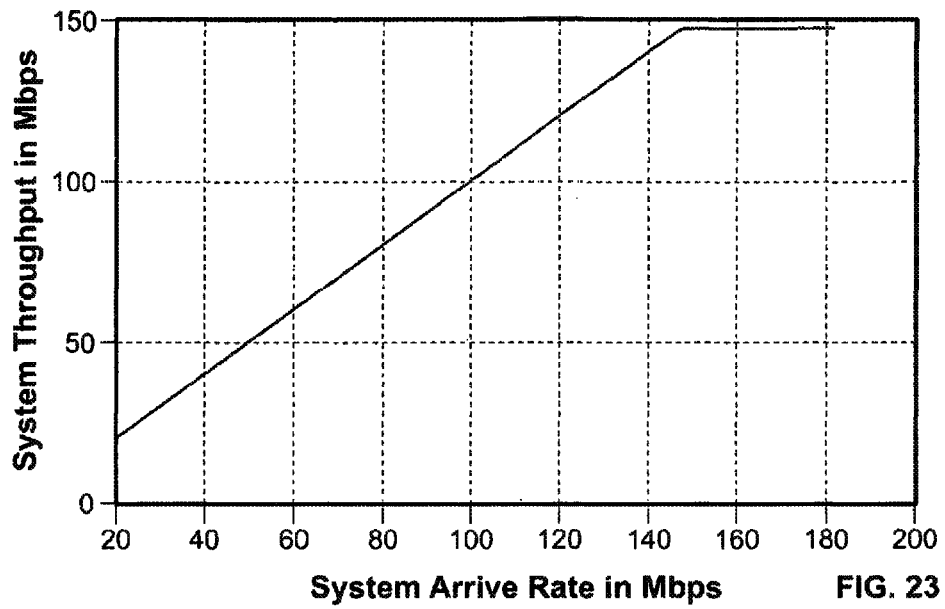
FIG. 23 is a graph of system throughput as a function of system arrival rate in accordance with some aspects of the disclosure.
Figure 24:
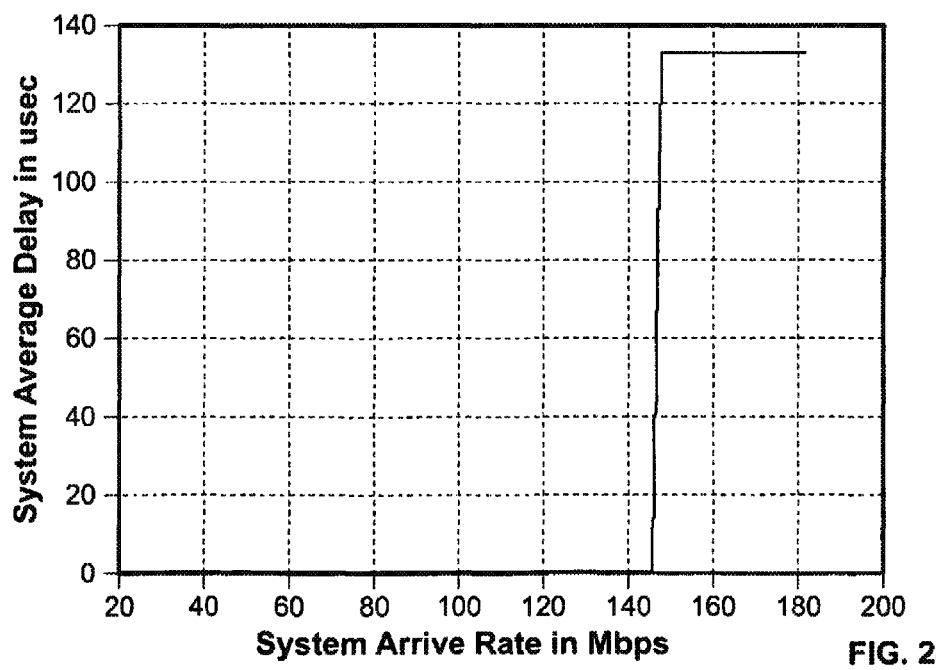
FIG. 24 is a graph of average delay as a function of system arrival rate in accordance with some aspects of the disclosure.

When active node number was less than or equal to the antenna number Nss, each node achieved near full throughput (37 Mbps), as shown in FIG. 23, with small delays as shown in FIG. 24.

As can be seen, MSA can significantly increase the system throughput with much smaller system delay as compared to CSMA/CA. MSA can quickly adapt to a dynamic wireless network. Moreover, MSA does not have the hidden node problem in a wireless network.

It should be appreciated that some portions of the detailed description have been presented in terms of procedures, steps, logic blocks, processing, and other symbolic representations of operations on data bits that can be performed on computer memory. A procedure, computer/machine executed step, action, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer and/or processing system. Further, these signals may have been referred to at times as bits, values, numbers, or the like. Finally, each step may be performed by hardware, software, firmware, or combinations thereof.

Thus, it will be apparent to those skilled in the computer, software and networking arts that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this disclosure. Additionally, the recited order of processing elements or sequences, or the use of numbers, letters, or other designations therefore, is not intended to limit the claimed processes to any order except as may be specified in the claims. Accordingly, the claim scope and coverage is to be limited only by the following claims and equivalents thereto.

What is claimed is:

1. A method comprising:
   receiving at a first node a plurality of signals from a plurality of nodes;
   determining a plurality of carrier frequency offsets for the plurality of nodes, wherein at least one carrier frequency offset of the plurality of carrier frequency offsets is different than another carrier frequency offset of the plurality of carrier frequency offsets;
   determining an average of the plurality of carrier frequency offsets;
   adjusting a local oscillator at the first node based on the average of the plurality of carrier frequency offsets; and
   transmitting data from the first node to one of the plurality of nodes according to a timing determined by the local oscillator.

2. The method of claim 1, wherein determining the carrier frequency offset for a node comprises receiving and analyzing one or more preambles.

3. The method of claim 1, further comprising estimating phase offsets of the plurality of signals.

4. The method of claim 3, further comprising transmitting from the first node to the plurality of nodes an estimation of the phase offsets of the plurality of nodes.

5. The method of claim 4, further comprising:
determining an index for each node by analyzing a frequency tone field in the signal received from that node, wherein the index is a randomly-selected complex tone; and
computing channel state information for each of the plurality of nodes.

6. A system comprising:
a first node with an associated transmit frequency and coupled to a plurality of other nodes via a network and comprising:
a local oscillator configured to generate a signal used to establish the transmit frequency; and
a processor configured to:
receive a signal from each of the plurality of other nodes;
determine a carrier frequency offset for each of the plurality of other nodes, wherein at least one carrier frequency offset of the plurality of other nodes is different than another carrier frequency offset of the plurality of other nodes;
determine an average of the plurality of carrier frequency offsets;
adjust the transmit frequency based on the average of the plurality of carrier frequency offsets; and
transmit data to at least one of the plurality of other nodes according to a timing determined by the local oscillator.

7. The system of claim 6, wherein when the processor determines the carrier frequency offset for a node, the processor receives and analyzes one or more preambles.

8. The system of claim 6, wherein the processor is further configured to estimate phase offsets of the signals received from each of the plurality of other nodes.

9. The system of claim 8, wherein the processor is further configured to transmit an estimation of the phase offsets of the plurality of nodes to the plurality of nodes.

10. The system of claim 9, wherein the processor is further configured to:
determine an index for each node through analysis of a frequency tone field in the signal received from that node, wherein the index is a randomly-selected complex tone; and
compute channel state information for each of the plurality of nodes.

* * * * *